(12) United States Patent
McClure

(10) Patent No.: US 12,378,987 B2
(45) Date of Patent: Aug. 5, 2025

(54) EXPANDABLE COLLET BODIES WITH SECTIONAL FINGER-BASED ANTI-ROTATION FEATURE, CLIPS INSERTS AND SYSTEMS THEREOF

(71) Applicant: Centrix AeroSpace LLC, Kent, WA (US)

(72) Inventor: Travis McClure, Kirkland, WA (US)

(73) Assignee: CENTRIX AEROSPACE LLC, Kent, WA (US)

( * ) Notice: Subject to any disclaimer, the term of this patent is extended or adjusted under 35 U.S.C. 154(b) by 0 days.

(21) Appl. No.: 18/501,903

(22) Filed: Nov. 3, 2023

(65) Prior Publication Data

US 2024/0077101 A1  Mar. 7, 2024

Related U.S. Application Data

(60) Continuation of application No. 17/823,029, filed on Aug. 29, 2022, now Pat. No. 11,898,590, which is a
(Continued)

(51) Int. Cl.
*F16B 37/04* (2006.01)
*F16B 19/10* (2006.01)
*F16B 33/00* (2006.01)

(52) U.S. Cl.
CPC ........ *F16B 37/043* (2013.01); *F16B 19/1081* (2013.01); *F16B 33/002* (2013.01); *F16B 37/04* (2013.01); *F16B 37/044* (2013.01)

(58) Field of Classification Search
CPC .. F16B 13/066; F16B 13/0858; F16B 13/122; F16B 13/124; F16B 13/128;
(Continued)

(56) References Cited

U.S. PATENT DOCUMENTS 1,604,762 A   10/1926  Slocum
1,978,935 A   10/1934  Douglas
(Continued)

FOREIGN PATENT DOCUMENTS

EP   0275160 A2   7/1988
GB     413403 A   7/1934
(Continued)

OTHER PUBLICATIONS

ISA United States Patent and Trademark Office, International Search Report Issued in Application No. PCT/US2017/019538, Jun. 28, 2017, WIPO, 3 pages.

*Primary Examiner* — Kristina R Fulton
*Assistant Examiner* — Jock Wong
(74) *Attorney, Agent, or Firm* — McCoy Russell LLP

(57) ABSTRACT

Expandable collet bodies with sectional finger-based anti-rotation features are disclosed. The collet body comprises not only a plurality of gripping finger as a first part of a two-part anti-rotation means (ARM), but also a first part of a two part translation arresting means (TAM), which may or may not be sectional in nature and the TAM prevents over translation of a collet body within the work piece(s), and cooperates with a second part of the TAM associated with a work piece or an auxiliary structure. In this manner, a collet body inserted into a work piece or auxiliary structure will not accidentally be pushed beyond the blind side of the work piece(s) during insertion or initial clamp-up.

8 Claims, 20 Drawing Sheets

Related U.S. Application Data division of application No. 16/543,457, filed on Aug. 16, 2019, now Pat. No. 11,460,066, which is a division of application No. 15/442,609, filed on Feb. 24, 2017, now Pat. No. 10,465,734.

(60) Provisional application No. 62/300,491, filed on Feb. 26, 2016.

(58) Field of Classification Search
CPC .... F16B 19/1081; F16B 33/002; F16B 37/04; F16B 37/043; F16B 37/044
USPC .... 411/54, 54.1, 55, 60.2, 172–175; 29/525, 29/525.02
See application file for complete search history.

(56) References Cited

U.S. PATENT DOCUMENTS

| | | | |
|---|---|---|---|
| 2,062,685 A | 12/1936 | Tinnerman | |
| 2,233,230 A | 2/1941 | Tinnerman | |
| 2,370,336 A | 2/1945 | Wallace | |
| 2,379,786 A | 7/1945 | Bugg et al. | |
| 2,649,884 A | 8/1953 | Westover | |
| 2,775,155 A | 12/1956 | Tompkins et al. | |
| 2,936,015 A | 5/1960 | Rapata | |
| 2,994,242 A | 8/1961 | Buff et al. | |
| 3,312,139 A | 4/1967 | Cristina | |
| 3,469,493 A * | 9/1969 | Fisher | F16B 19/1081 248/239 |
| 4,263,833 A | 4/1981 | Loudin et al. | |
| 4,405,272 A | 9/1983 | Wollar | |
| 4,971,497 A | 11/1990 | Stoffer et al. | |
| 5,065,490 A | 11/1991 | Wivagg et al. | |
| 5,704,752 A | 1/1998 | Logerot | |
| 6,174,118 B1 | 1/2001 | Rebers et al. | |
| 6,287,044 B1 | 9/2001 | Huber | |
| 7,993,085 B2 | 8/2011 | McClure | |
| 8,075,234 B2 * | 12/2011 | McClure | F16B 37/043 411/55 |
| 8,777,537 B2 | 7/2014 | Fritsch | |
| 9,097,273 B2 | 8/2015 | Branning et al. | |
| 9,709,085 B2 | 7/2017 | McClure | |
| 10,094,408 B2 | 10/2018 | McClure | |
| 10,190,613 B2 | 1/2019 | Niklewicz et al. | |
| 10,465,734 B2 * | 11/2019 | McClure | F16B 19/1081 |
| 11,460,066 B2 | 10/2022 | McClure | |
| 2002/0144574 A1 | 10/2002 | Avetisian et al. | |
| 2005/0169726 A1 * | 8/2005 | McClure | F16B 37/043 411/55 |
| 2007/0224018 A1 | 9/2007 | DePerro et al. | |
| 2007/0243037 A1 | 10/2007 | Pratt | |
| 2010/0086376 A1 | 4/2010 | McClure | |
| 2011/0008124 A1 | 1/2011 | Niklewicz et al. | |
| 2013/0014376 A1 | 1/2013 | Komsitsky et al. | |
| 2017/0248163 A1 | 8/2017 | McClure | |
| 2023/0109381 A1 | 4/2023 | Hill | |

FOREIGN PATENT DOCUMENTS

| | | |
|---|---|---|
| GB | 624714 A | 6/1949 |
| GB | 1548964 A | 7/1979 |
| JP | H1151018 A | 2/1999 |
| WO | 8701419 A1 | 3/1987 |

* cited by examiner

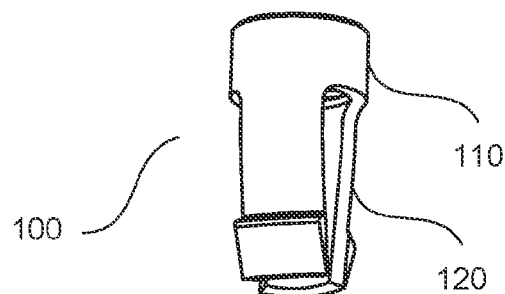
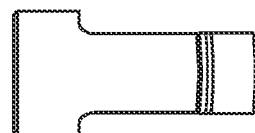
FIG. 1  FIG. 2
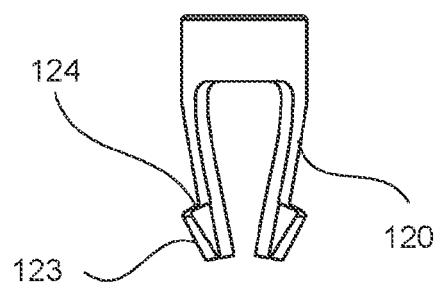
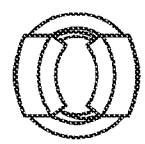
FIG. 3  FIG. 4
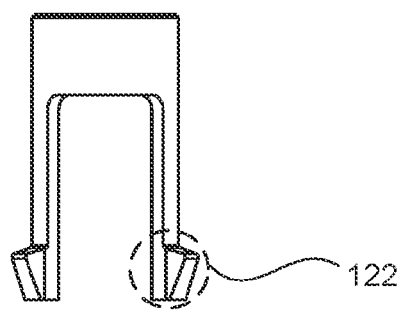
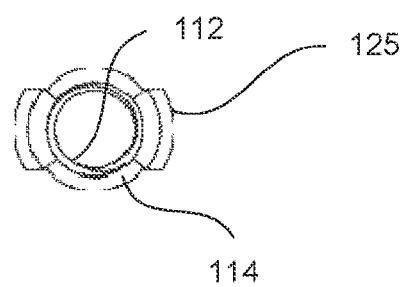
FIG. 5  FIG. 6
FIG. 7  FIG. 8

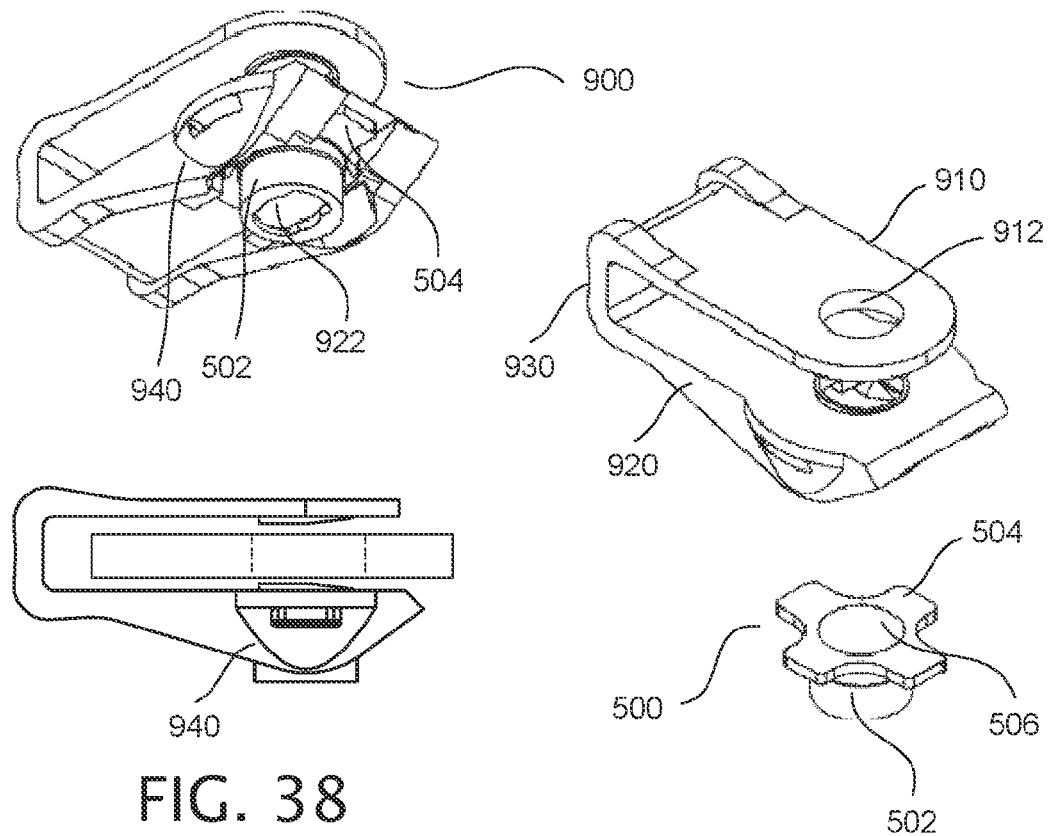
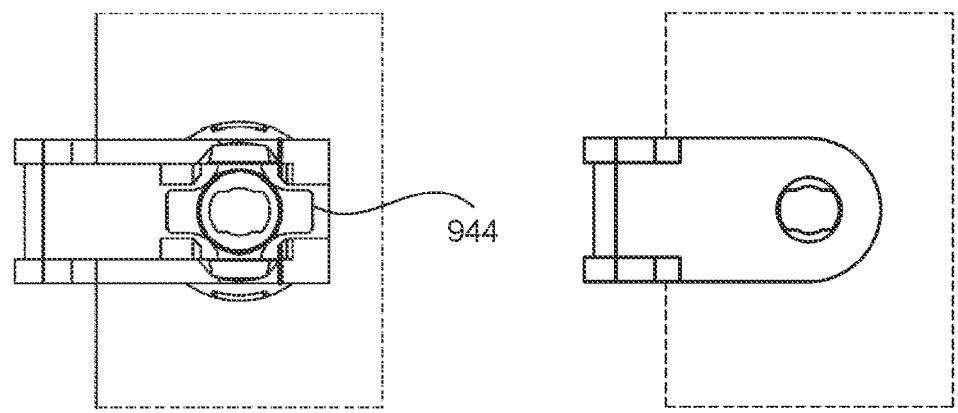

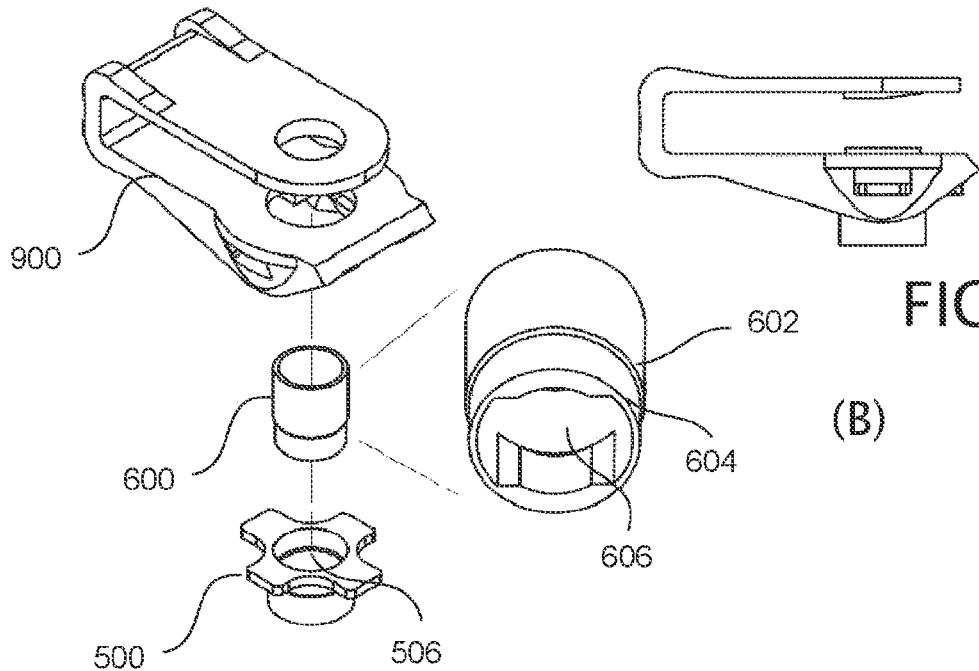
FIG. 45
FIG. 46
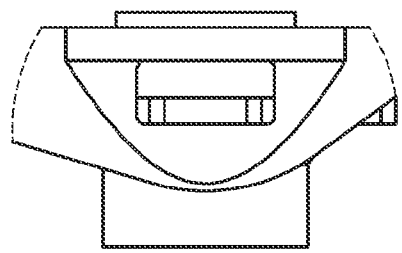
FIG. 47
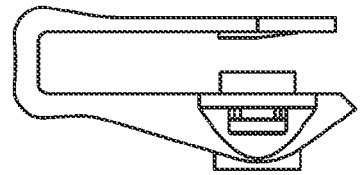
FIG. 48
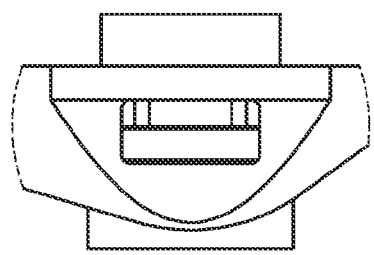
FIG. 49
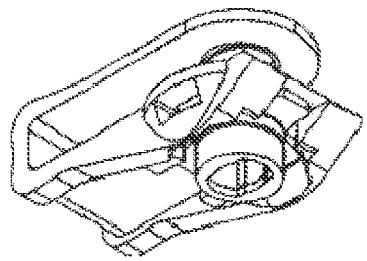
FIG. 50

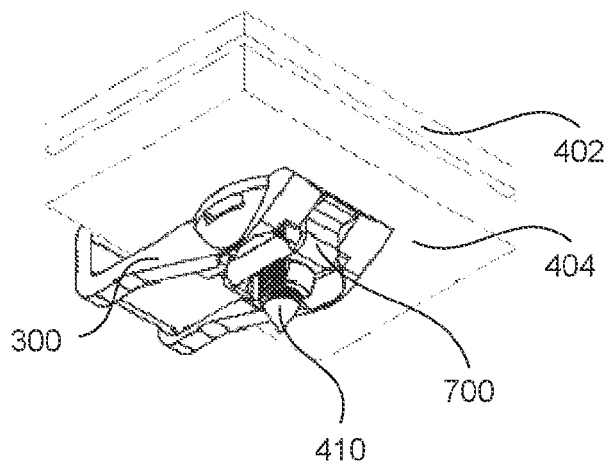 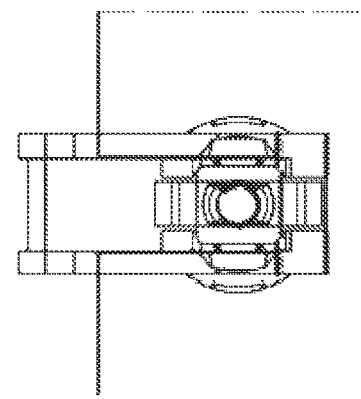
FIG. 58  FIG. 59
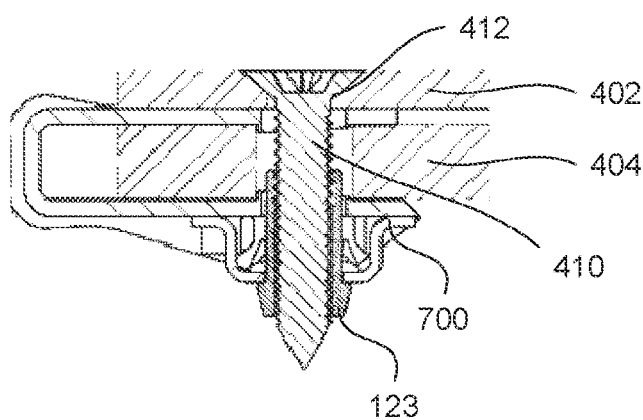 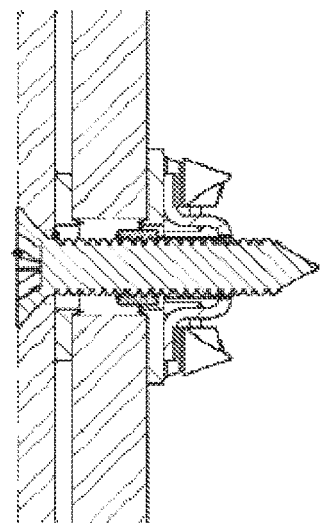
FIG. 60  FIG. 61

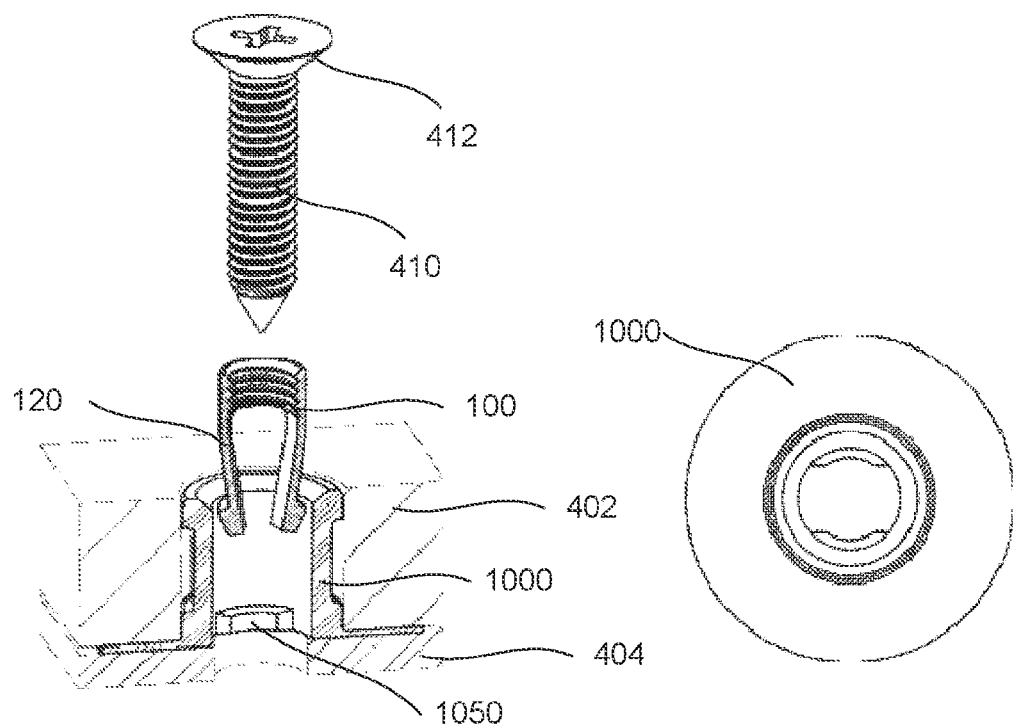
FIG. 69
FIG. 70
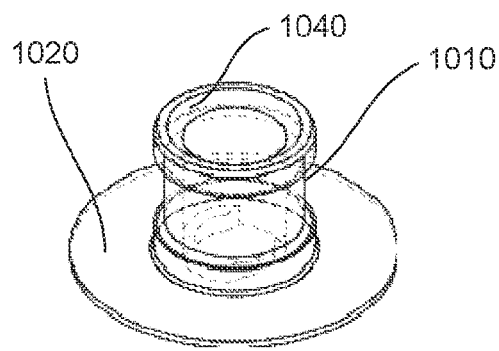
FIG. 71
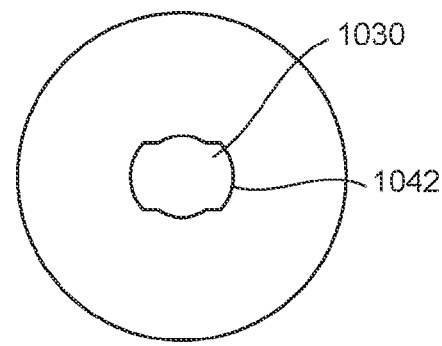
FIG. 72

EXPANDABLE COLLET BODIES WITH SECTIONAL FINGER-BASED ANTI-ROTATION FEATURE, CLIPS INSERTS AND SYSTEMS THEREOF

CROSS-REFERENCE TO RELATED APPLICATIONS

The present application is a continuation of U.S. patent application Ser. No. 17/823,029, entitled "EXPANDABLE COLLET BODIES WITH SECTIONAL FINGER-BASED ANTI-ROTATION FEATURE, CLIPS, INSERTS AND SYSTEMS THEREOF", and filed on Aug. 29, 2022. U.S. patent application Ser. No. 17/823,029 is a divisional of patent application Ser. No. 16/543,457, entitled "EXPANDABLE COLLET BODIES WITH SECTIONAL FINGER-BASED ANTI-ROTATION FEATURE, CLIPS, INSERTS AND SYSTEMS THEREOF", and filed on Aug. 16, 2019. U.S. patent application Ser. No. 16/543,457 is a divisional of U.S. patent application Ser. No. 15/442,609, entitled "EXPANDABLE COLLET BODIES WITH SECTIONAL FINGER-BASED ANTI-ROTATION FEATURE, CLIPS, INSERTS AND SYSTEMS THEREOF", and filed on Feb. 24, 2017. U.S. patent application Ser. No. 15/442,609 claims priority to U.S. Provisional Application No. 62/300,491, entitled "EXPANDABLE COLLET BODIES WITH SECTIONAL FINGER-BASED ANTI-ROTATION FEATURE, CLIPS, INSERTS AND SYSTEMS THEREOF", and filed on Feb. 26, 2016. The entire contents of each of the above-listed applications are hereby incorporated by reference for all purposes.

TECHNICAL FIELD

This description relates generally to collet bodies and more specifically to expandable collet bodies with sectional finger-based anti-rotation features.

BACKGROUND

Prior efforts in the field of single side fasteners (SSFs), and particularly expandable collet SSFs, relied upon an outer surface portion of a collet body to provide a suitable first part of a two part anti-rotation means (the second part thereof being associated with an auxiliary structure such as a housing, work piece or intermediate member, e.g., a sleeve insert, whether intrinsically or extrinsically). These anti-rotation means would prevent the collet body from rotating with respect to the auxiliary structure during rotational engagement with a screw or other rotation inducing collet expanding member while still permitting translation between the collet body and the auxiliary structure. Additionally, anti-translation means were often co-located with the collet body resident anti-rotation means. A presumed reasoning behind location of these features at or near the non-segmented body portion (proximal end) of the collet body was that maximal collet body extension would be achieved by locating the collet body anti-translation means as far from the fingers as possible, which structure was responsible for the blind side engagement aspects of the collet body.

Unless an auxiliary structure such as a work piece or sleeve insert is to be deformed in order to provide a suitable counterpart to the collet body anti-rotation means, i.e., a second part of the two part anti-rotation means, it is necessary to provide a round hole (more accurately, any portion of a round cylinder defining a bore) with some attribute that functions as a second part of an anti-rotation means. Because the prior art collet bodies relied upon anti-rotation means on an outer surface of the collet body, and preferably at a proximal end thereof, it was necessary to ensure that the second part of the anti-rotation means associated with the auxiliary structure was available during the full axial stroke of the collet body. Thus, the prior art systems and uses of the collet body relied upon affecting the characteristics of the hole through which it traversed in order to provide complementary anti-rotation structure.

Accordingly it may be desirable to have expandable collet bodies with secure anti-rotation features not relying on the through holes.

SUMMARY OF THE INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The invention of this application is directed to a variety of expandable collet bodies, auxiliary structures such as clips and sleeve inserts, and systems using the same, the collet bodies of which comprises gripping fingers having a sectional first part of a two part anti-rotation means (hereinafter "collet body ARM" in specific, and "ARM" in general), preferably for use in single side fastening of two or more work pieces defining substantially alignable or registrable apertures. In some embodiments, at least one work piece comprises a second part of the two part anti-rotation means (hereinafter "work piece ARM" in specific), while in other embodiments an auxiliary structure is used that comprises the second part of the two part anti-rotation means (hereinafter "auxiliary structure ARM" in specific). Methods for fastening such work pieces using collet bodies comprising sectional ARMs are also disclosed. The term "sectional" and its function with respect to the claimed invention embodiments will be described in detail below.

As used herein, the term "work piece" and its plural refer to any structure that is to be compressively engaged, either directly or indirectly, by a SSF according to the invention. Thus, work pieces in a typical application comprise a fixture or a portable structure to which is compressively joined another fixture or portable structure. Examples include floor tracks and floor panels. "Auxiliary structure" and its plural as used herein, refer to any structure that is not necessary to incorporate in the work pieces make-up, but is nevertheless included for purposes other than a desired function resulting from the joining of the work pieces. Thus, an auxiliary structure may facilitate, enhance or optimize the compressive joinder between work pieces, but its presence is not required in order for the work pieces to be joined or function when otherwise joined, e.g., the fact that an anti-rotation and/or anti-translation means is not fully enabled by the work pieces does not transform an auxiliary structure having such feature into a work piece or other necessary structure, unless expressly stated herein. Examples include track clips and panel inserts.

The terms "area", "boundary", "part", "portion", "surface", "zone", and their synonyms and plural forms, as may be used herein, are intended to provide descriptive references or landmarks with respect to the object being described. These terms are not intended, nor should be inferred, to delimit or define per se elements of the referenced object, unless specifically stated as such or facially clear from the several drawings and the context in which the term(s) is/are used. In addition, the terminal ends of any numeric lead lines in the several drawings, when associated with any such term(s), are intended to representatively identify such references or landmarks with respect to the object being described. They are not intended, nor should be inferred, to delimit or define per se boundaries of the referenced object, unless specifically stated as such or facially clear from the drawings and the context in which the term(s) is/are used.

In addition to each collet body gripping finger comprising a sectional first part of a two-part ARM, such collet bodies also comprise a first part of a two part translation arresting means (hereinafter "collet body TAM" in specific, and "TAM" in general), which may or may not be sectional in nature. The TAM prevents over translation of a collet body within the work piece(s), and cooperates with a second part of the TAM associated with a work piece or an auxiliary structure. In this manner, a collet body inserted into a work piece or auxiliary structure will not accidentally be pushed beyond the blind side of the work piece(s) during insertion or initial clamp-up.

Turning then to the structural aspects of the collet bodies according to the invention, each such collet body, which is preferably constructed from a resilient metal or polymer, defines a longitudinal axis and comprises a first end defining a generally radially discontinuous (open) opening and a second end defining a generally radially continuous (closed) circular opening.

Defining and extending from the first end is a first wall portion having an inner surface and an outer surface. The first wall portion defines at least two slots extending substantially longitudinally from the first end towards the second end. The at least two slots, which are preferably in diametric opposition, thereby create at least two gripping fingers or legs, which are preferably flexible in the radial direction. Alternatively stated, each slot is defined by a first longitudinal collet body finger section comprising a first finger face portion of the first finger, which is bounded by first inner and outer edges; a second longitudinal collet body finger section comprising a second finger face portion of the second finger, which is bounded by second inner and outer edges; and a transverse collet body section comprising a spanning face portion extending from the first finger to the second finger, which is bounded by spanning inner and outer edges (this spanning face portion also defines the longitudinal end of a finger defining slot). Collet bodies according to the invention preferably have two fingers or more, which regardless of the number are preferably spaced equidistant about the body, e.g., evenly spaced apart.

A radially extending portion characterized as a gripping element or annular protrusion (visually segmented due to the presence of the longitudinal slots) extends radially outwardly from the first wall portion proximate to the first end. In many embodiments, the protrusion comprises a leading surface (generally presenting to the first end) and a trailing surface (generally presenting to the second end). The leading surface is preferably sloped or beveled to act as a transition between the first wall external diameter and the maximum external diameter of the protrusion; because the trailing surface will compressively react against one of the work pieces or auxiliary structure when suitably engaged therewith, it is preferably substantially orthogonal (or slightly oblique) to the collet body axis.

Defining and extending from the second end is a second wall portion having an inner surface and an outer surface. A characteristic of the second wall portion is that the inner surface thereof defines one or more threads characterized as being complementary to an insertable threaded element such as a threaded bolt, screw and/or stud. Preferably, the thread (s) extend from substantially the second end to a location proximate to where the longitudinal slots terminate, thereby maximizing the contact area between the collet body and an inserted threaded element such as a screw.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1-8 are a first embodiment of an expandable collet body with various views.

FIGS. 36-40 are a second embodiment of the clip comprising an insertable bushing rotationally constrained by a portion of the clip to function as the second part of the two-part ARM and the second part of the two-part TAM.

FIGS. 45-50 are a third embodiment of the clip comprising a sleeve, a primary insertable bushing disposed in a secondary insertable bushing.

FIGS. 58-61 are a fifth system embodiment of the fastening system comprising a collet body, the fourth embodiment of the clip as shown in FIGS. 55-57 and a screw.

FIGS. 69-72 are a seven system embodiment of the fastening system comprising a screw, the collet body shown in FIGS. 1-8, and a sleeve insert to fasten a stack (shown in phantom) comprising a proximal and a distal structures.

Like reference numerals are used to designate like parts in the accompanying drawing.

DETAILED DESCRIPTION

Figure 9:
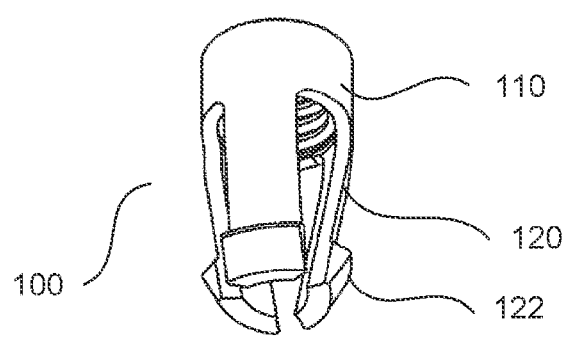
FIGS. 9-16 are a second embodiment of an expandable collet body with various views.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a dual purpose latch. Although the present examples are described and illustrated herein as being implemented in an aircraft system, the system described is provided as an example and not a limitation. As those skilled in the art will appreciate, the present examples are suitable for application in a variety of different types of panel systems having latches.

As previously described with respect to the prior art, collet body ARM have heretofore required some form of complimentary ARM within the bore(s) or hole(s) the collet body would translate because the collet body ARM component was a surface feature thereof. In other words, both the collet body ARM and its work piece/auxiliary structure counterpart were anything by circular.

Collet body embodiments according to the present invention, however, are generally, but not exclusively, characterized as having a circular outer (peripheral in cross section) surface, i.e., constant radius, when viewed in cross section, or have a surface/cross sectional profile at the second wall portion that does not operatively interact with the work piece and/or auxiliary structure ARM. Alternatively characterized, such end and/or body portion would lack a functional anti-rotation feature external to the collet body (projecting from or depending into the outer or peripheral surface of the second wall). FIGS. 1-8 are a first embodiment of an expandable collet body 100. Specifically, FIG. 1 is a perspective view of a collet body; FIG. 2 is a first side elevation view of the collet body; FIG. 3 is a second side elevation view of the collet body; FIG. 4 is a bottom plan view of the collet body; FIG. 5 is a third side elevation view of the collet body; FIG. 6 is a second bottom plan view of the collet body; FIG. 7 is an isolated cross section view of the fingers having radial cut fingers (i.e., the leg sectional faces and the collet body radius lie on the same plane (they are congruent)); FIG. 8 is an isolated cross section view of the fingers having chord cut face.

The collet body comprises a cylindrical wall portion 110 having an inner surface 112 and an outer surface 114. The cylindrical wall portion 100 defines at least two slots extending substantially longitudinally from the first end towards the second end. The at least two slots, which are preferably in diametric opposition, thereby create at least two gripping fingers or legs 120, which are preferably flexible in the radial direction. Alternatively stated, each slot is defined by a first longitudinal collet body finger section comprising a first finger face portion of the first finger, which is bounded by first inner and outer edges; a second longitudinal collet body finger section comprising a second finger face portion of the second finger, which is bounded by second inner and outer edges; and a transverse collet body section comprising a spanning face portion extending from the first finger to the second finger, which is bounded by spanning inner and outer edges (this spanning face portion also defines the longitudinal end of a finger defining slot). Collet bodies according to the invention preferably have two fingers or more, which regardless of the number are preferably spaced equidistant about the body, e.g., evenly spaced apart.

Each finger 120 comprises a radially extending portion characterized as a gripping element or annular protrusion 122 (visually segmented due to the presence of the longitudinal slots) at a fingertip (or a distal end of the finger). In many embodiments, the protrusion 122 comprises a leading surface 123 (generally presenting to the first end) and a trailing surface 124 (generally presenting to the second end). The leading surface is preferably sloped or beveled to act as a transition between the first wall external diameter and the maximum external diameter 125 of the protrusion; because the trailing surface will compressively react against one of the work pieces or auxiliary structure when suitably engaged therewith, it is preferably substantially orthogonal (or slightly oblique) to the collet body axis.

The inner surface 114 of the cylindrical wall defines one or more threads characterized as being complementary to an insertable threaded element such as a threaded bolt, screw and/or stud. Preferably, the thread(s) extend from substantially the second end to a location proximate to where the longitudinal slots terminate, thereby maximizing the contact area between the collet body and an inserted threaded element such as a screw.

The gripping fingers 120 are preferably flexible in the radial direction. In a default state, the gripping fingers 120 converge radically inward slightly (convergingly biased) such that the whole protrusion 122 is within a radical area defined by the cylindrical wall portion. When pushed radically outward in an expanded state (in FIG. 6), by an external threaded bolt, the gripping fingers 120 diverge radically outward and the whole protrusions 122 are beyond the radical area defined by the cylindrical wall portion.

FIGS. 9-16 are a second embodiment of an expandable collet body with various views. The second embodiment is basically the same as the first embodiment of the collet body, except that the second embodiment has three gripping fingers instead of two fingers.

Figure 10:
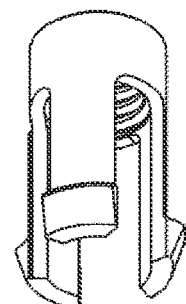
Figure 11:
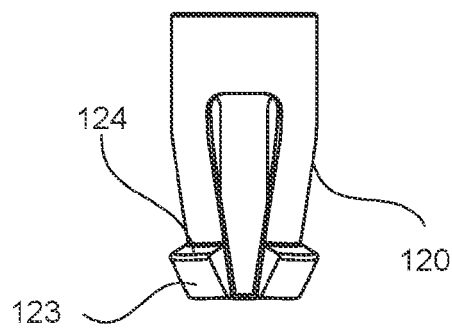
Figure 12:
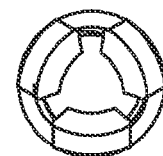
Figure 13:
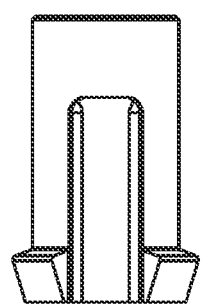
Figure 14:
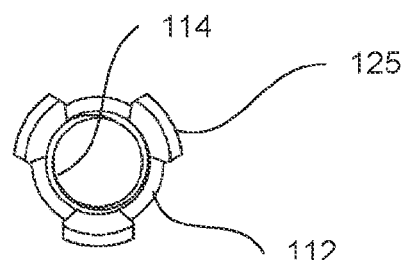
Figure 15:
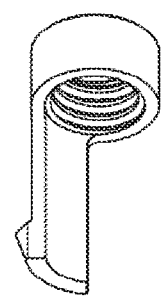
Figure 16:
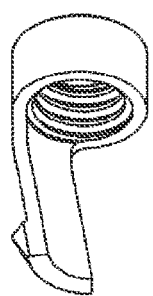

Specifically, FIG. 9 is a perspective view of the collet body with three fingers; FIG. 10 is a second perspective view of the collet body in an expanded state; FIG. 11 is a side elevation view of the collet body; FIG. 12 is a bottom plan view of the collet body; FIG. 13 is a second side elevation view of the collet body in an expanded state; FIG. 14 is a second bottom plan view of the collet body in an expanded state; FIG. 15 is a first perspective view of an alternative of the collet body wherein one finger is used as opposed to two; FIG. 16 is a second perspective view of the alternative collet body of FIG. 15 but wherein the collet body finger is shown in an expanded state.

One of ordinary skill in the art may understand that expandable collet body of other configurations may be also available in reference to the exemplary embodiments shown in FIGS. 1-16. For example, four or more gripping fingers may be used. The gripping fingers may have the same or different width. The gripping fingers may be distributed uniformly or non-uniformly along the circumference of the cylindrical wall portion.

The collet body shown in FIGS. 1-16 comprise at least one collet body ARM (a first part of a two part ARM) disposed at one or more of the collet body fingers. More particularly and unlike the prior art wherein outer surface feature geometries and/or peripheral cross sectional profiles at the second end provided structure comprising the collet body ARM, collet body ARM s according to the invention comprise at least part of a finger section face portion. The primary functional requirement of such structure is that it is capable of encountering a second part of the two part ARM during translation of the collet body within at least one work piece/auxiliary structure, and thereby substantially arrest rotation of the collet body when subjected to rotational forces such as would be encountered during clamp up actions.

In certain invention embodiments, the slots and the collet body ARM(s) (as well as the collet body fingers) can be formed (or the geometry thereof visualized) by removing an arc section of the collet body first wall portion. In these embodiments, as shown in FIG. 7, which are termed hereinafter as "arc embodiments", the collet body radius lies within the plane of each longitudinal finger sectional face portion. Prevention of collet body axial rotation can then occur if the second part of the ARM (work piece or auxiliary structure) includes at least one projecting element that compressionally contacts with the finger sectional face portion during operation of a system comprising the collet body, a screw and a work piece or auxiliary structure. The circumferential width (arc) of the slots (or corresponding fingers) is determined by the width (e.g., kerf) of the removed material. The skilled practitioner will appreciate that the collet body can also initially be formed to possess these characteristics, and that the method of creating the described structure is not exclusive.

In certain other invention embodiments, the slots and the collet body ARM(s) (as well as the collet body fingers) can be formed (or the geometry thereof visualized) by removing an off-axis chord section of the collet body first wall portion. In these embodiments, which are termed hereinafter as "chord embodiments" as shown in FIG. 8, a hypothetical line from one finger sectional face defining a portion of a first slot to an opposing finger sectional face defining another portion of the first slot has a radial distance from the collet body axis that is less than the radius of the collet body's inner surface at the same location. The circumferential width (arc) of the slots (or corresponding fingers) is determined by the depth of the chord (distance from the collet body axis) of the removed material. The skilled practitioner will appreciate that the collet body can also initially be formed to possess these characteristics, and that the method of creating the described structure is not exclusive.

Figure 17:
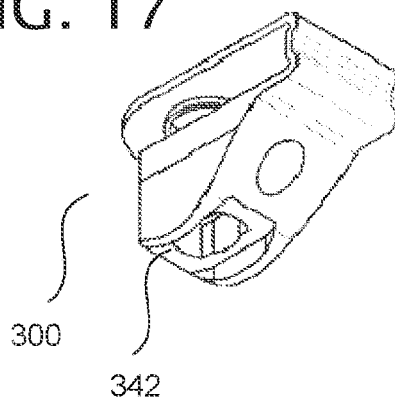
FIGS. 17-23 are a first embodiment of a clip with various views.
Figure 77:
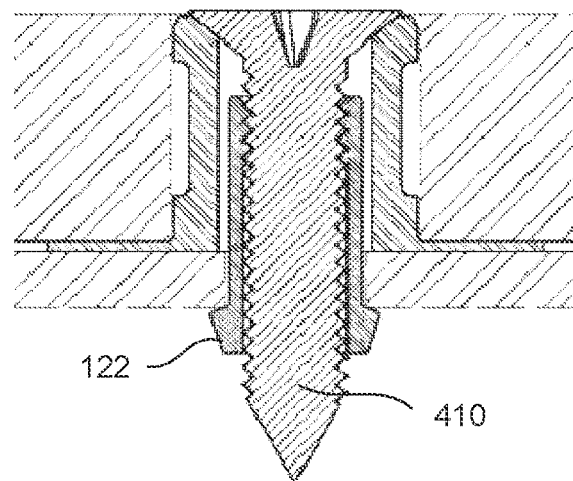
FIG. 77 is a cross-section of the system shown in FIGS. 67-68 at a full clamp-up state.

Disclosure shown in FIGS. 17-77 relates to various clips and/or inserts introduced as a second part of the ARM. Prevention of collet body axial rotation in chord embodiments can then occur if the second part of the ARM (work piece or auxiliary structure) comprises at least one flat key or similar complementary structure that compressionally contacts with the finger sectional face portion during operation of a system comprising the collet body, a screw and a work piece or auxiliary structure. While substantial correspondence is considered preferable, those persons skilled in the art will appreciate that any material rotational interference between the first and second parts of the anti-rotation means is sufficient to meet the functional requirement of the parts.

An advantage to these forms of ARM is that they are exceptionally resistant to high torque loads. Prior art collet body ARM relied upon peripheral surface geometry (extending or depending features from the outer surface of the second end and/or body portion adjacent thereto) to resist torque imposed compression loads—all loads were presented to the surface of the collet body leaving unaddressed the prospect collet body ARM deformation due to high torque loads. However, in both arc and chord collet body ARM embodiments, reactive forces are transmitted to a section of the collet body, which has significant resistance to compression forces.

Because the invention embodiments are often directed to intrinsic anti-rotation environments (as opposed to extrinsic environment wherein a tool or temporary mechanical ground is used to establish and maintain a counter rotation force against the collet body when torque is introduced thereto by a turning threaded member such as a screw), it is clear that a mechanically grounded structure other than the collet body must possess the second part of the two part ARM, which leaves either at least one work piece or at least one auxiliary structure as viable candidates (work piece and/or auxiliary structure ARM). In either case, the second part of the two part ARM should be functionally available to the collet body during its intended modes of use, namely full stroke translation. Moreover, it should comprise structure that provides at least one structural instance upon which the specific collet body ARM may react. Therefore, the work piece and/or auxiliary structure will comprise at least one second part of the two part ARM. Additionally, because the collet body ARM is part of the collet body first wall portion, and therefore ipso facto not proximate to the second or proximal end, it is important for instances wherein over-stroke is encountered (that is where the collet body fingers/legs extend past the distal work piece/auxiliary structure during insertion and clamp-up) to locate the second part of the ARM at or near the distal or outer surface of the most distal work piece. In this manner, a maximum length of the collet body can extend from the most proximal work piece through to the most distal work piece and/or auxiliary structure and still be subject to limited rotation. However, where the most distal work piece is sectionally thin in comparison with a more proximal work piece that does possess a distally located ARM, the importance of most distal location is lessened.

The second part ARM found in work pieces and/or auxiliary structures preferably has an axial profile complementary to that of the collet body at its first part ARM such that each ARM part is the negative of the other (much as a splined collar is the negative of a complementary splined shaft and vice versa). At a minimum, there must be at least one reacting surface that functions as the second part ARM. In many embodiments, this second part ARM is a radially inwardly projecting a (especially applicable where the collet body slot is characterized as a removed arc section) or a projecting flat (especially applicable where the collet body slot is characterized as a removed chord section). In these embodiments, a surface of the projecting arc or flat compressively contacts at least a portion of one finger sectional face portion when the collet body is urged to rotate within the boundaries of the work piece/auxiliary structure that comprises the second part ARM.

In some embodiments, the work piece(s) will possess at least one structural attribute that functions as the second part of the ARM, i.e. the work piece(s) comprise(s) an element or portion such that when the collet body is disposed therein and subject to rotation, the collet body ARM engages with the work piece(s) ARM to prevent rotation there between. While the location of this work piece ARM need only be at an axial position wherein it will encounter the collet body first part ARM when the collet body is compressive contact with the at least two work pieces, in many environments, the second part will be located at or adjacent to a distal "outer" work piece's outer surface (i.e., the surface that defines the hole through which the collet body first end but not the collect body second end extends).

In addition to one or more work pieces possessing at least one structural attribute that qualifies as a second part ARM, certain invention embodiments contemplate the incorporation of an auxiliary structure such as a clip or a work piece insert, which has a second part ARMs and functions as a reactive structure to the compressive forces exerted by a screw head when an assembly comprising the collet body is in a fully clamped up state, the auxiliary structure ARM of the present invention is geometrically different and functionally distinct. Inserts according to the various invention embodiments mimic the functionality of work pieces having intrinsic second part ARMs. In other words, such inserts establish internal bore geometry for the collet body that comprises the second part ARM. In this way, a round bore or hole can be modified to comprise the second part ARM by insertion of such an insert.

Figure 18:
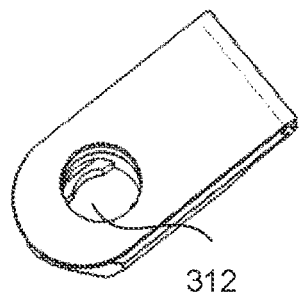
Figure 19:
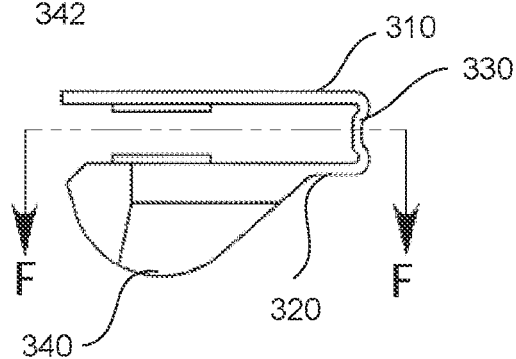
Figure 20:
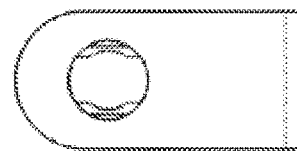
Figure 21:
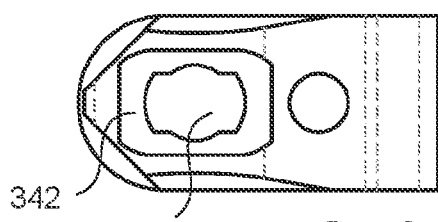
Figure 22:
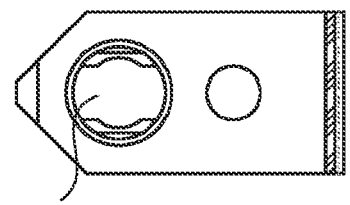
Figure 23:
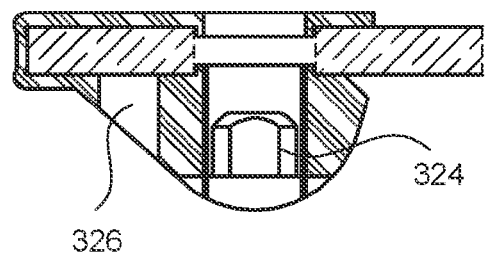

FIGS. 17-23 are a first embodiment of a clip 300 with various views. Specifically, FIG. 17 is a first perspective view of the first clip functioning as a second part of the ARM; FIG. 18 is a second perspective view of the clip; FIG. 19 is an elevation view of the clip; FIG. 20 is a top plan view of the clip; FIG. 21 is a bottom plan view of the clip; FIG. 22 is a plan view in cross-section taken substantially along the lines F-F of FIG. 19; FIG. 23 is an elevation view in cross-section of the clip engaged with a substructure (in phantom).

The clip 300 is a "U" shaped clip having a proximal leg 310 that defines a proximal hole 312, a distal leg 320 that defines a distal hole 322 aligned to the proximal hole 312, and a middle leg 330 joining the proximal leg 310 and the distal leg 320. The holes do not necessarily modify the internal surface geometry of the bore or hole in which the collet body is inserted, although such modification is within the scope of the invention. Instead, the second part ARM is generally located external of the work piece bores or holes, and forms a functional part of a clip at the distal hole that is rotationally grounded to at least one work piece, and preferably to a distal work piece.

In some embodiments, the distal leg 320 has a lump 340, through which the distal hole 322 goes. The lump 340 has a surface 342, preferably flat or negatively inclined, that may be used to compress the trailing surface 124 once the clip 300 is engaged to the collet body. The distal hole 322 has at least a section having an axial profile complementary to that of the collet body at its first part ARM such that each ARM part is the negative of the other (much as a splined collar is the negative of a complementary splined shaft and vice versa). In some embodiments, the axial profile may be implemented by incorporating a bulge 324 within the distal hole 324 near the distal hole opening. The bulge 324 is complementary to the collet body fingers such that when the clip 300 and the collet body 100 are engaged, the bulge 324 is positioned right at slots between the gripping fingers.

Figure 24:
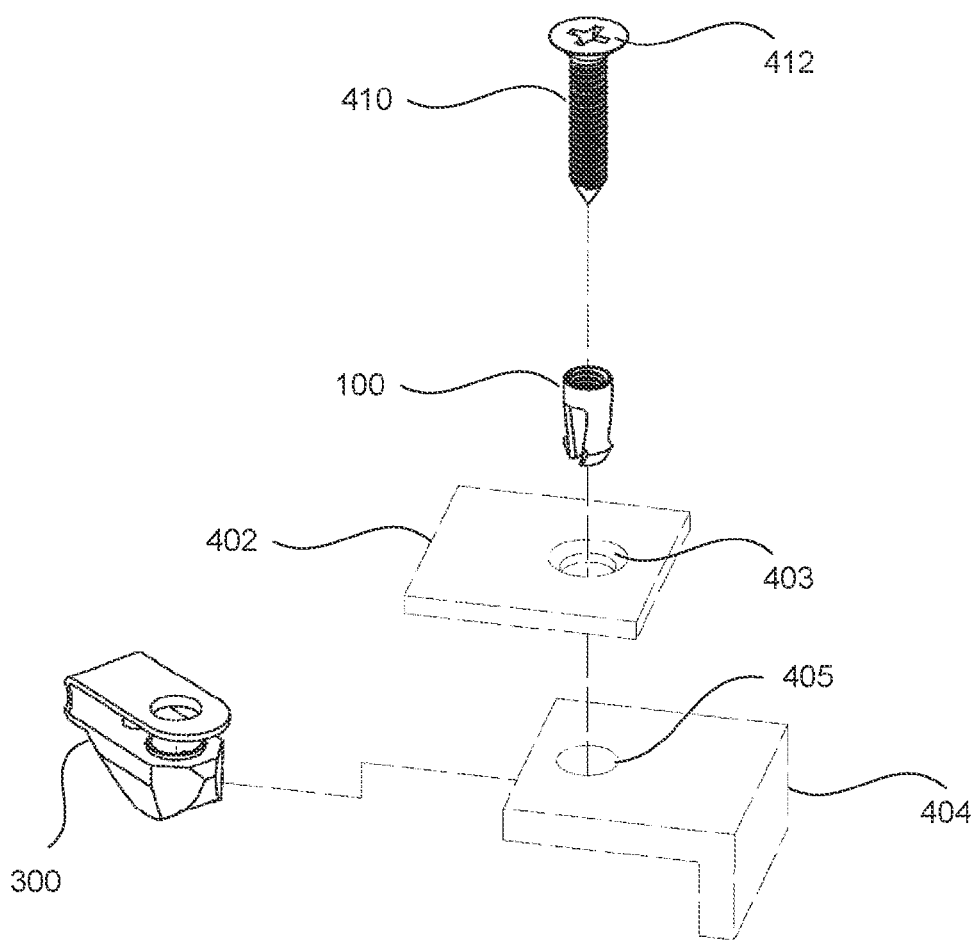
FIGS. 24-25 are a first system embodiment of a fastening system comprising the collet body shown in FIGS. 1-8, the clip shown in FIGS. 17-23, and a screw to compress a panel (upper or proximal structure) and a substructure (bottom or distal structure) together.
Figure 25:
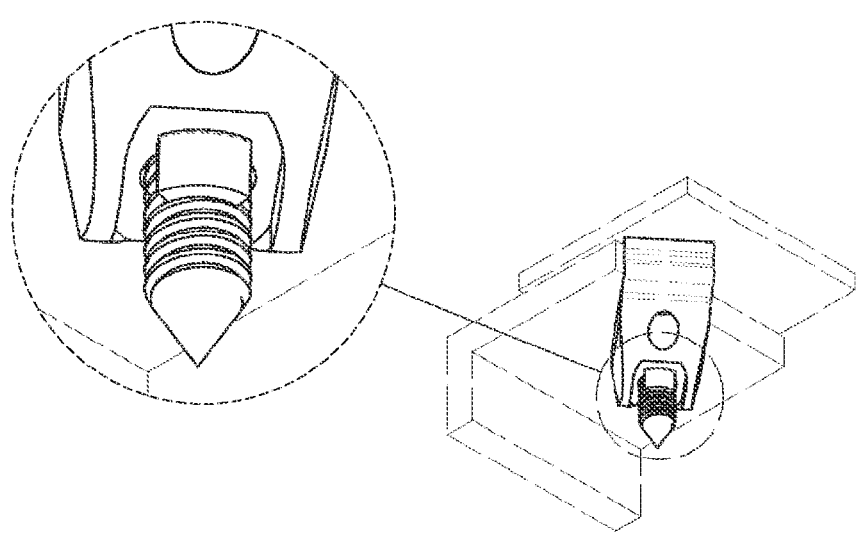
Figure 26:
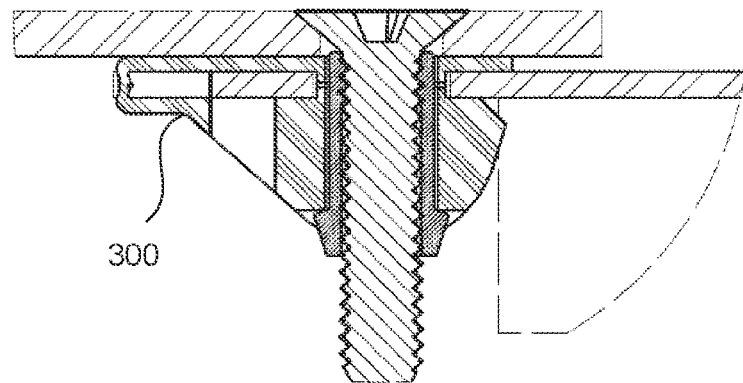
FIGS. 26-26 are a cross-section view of the fastening system shown in FIGS. 24-25 in a fully clamped-up state.

FIGS. 24-25 are a first system embodiment of a fastening system comprising the collet body shown in FIGS. 1-8, the clip shown in FIGS. 17-23, and a screw to compress a panel (upper or proximal structure) and a substructure (bottom or distal structure) together. Specifically, FIG. 24 is an upper exploded perspective view; and FIG. 25 is a lower perspective view, with detail, of the system shown in FIG. 24 wherein the collet body and screw are shown fully extended through the clip and in an engaged state. FIGS. 26-26 are a cross-section view of the fastening system shown in FIGS. 24-25 in a fully clamped-up state.

In operation, the collet body 100 is inserted into a proximal work piece 402 via a proximal work piece bore 403, a distal work piece 404 via a distal work piece bore 405, and the auxiliary structure 300. The collet body fingers are convergingly biased such that the collet body is able to pass through any hole and/or orifice defined thereby. After insertion, a screw or similar occupying structure 410 is rotatably inserted within the collet body 100. The screw 410 has matching thread with the inner surface of the collet body 100. Therefore, when the screw 410 gradually engages to the collet body 100, it radially pushes the gripping fingers 120 outward and preferably causes sufficient radial expansion of the fingers such that they contact or are proximate to at least the auxiliary structure ARM. In any circumstance, the degree of radial expansion must be sufficient to permit rotational compression between the collet body ARM and the auxiliary structure ARM. In some embodiments, the screw 410 has a flat head 412 with groove, such as Phillips or flat driver, for external driver engagement. When the screw 410 is rotated further, the collet body 100 starts to move upward (or start retraction toward the workpiece) since the collet body is not able to rotate due to the rotational restriction between the collet body ARM and the auxiliary structure ARM. The retraction of gripping fingers will eventually cause contact and compression between the trailing surface 124 and the surface 342, therefore securely fasten the work pieces 402 and 404 together. Preferably, the screw 410 has a flat head 412 such that the screw 410 is flushed with the work piece 402 in a fully clamped-up state.

Incorporating the second part ARM in the external clip is advantageous, should relevant work pieces lack such a structure and/or an insert is not desired or possible. Unlike prior art auxiliary structure anti-rotation means that acted on or near the second or proximal end of the collet body, the clip 300 act on or near the first or distal end of the collet body 100 at full clamp-up, e.g., along at least one collet body sectional finger face. This is because at full clamp-up, when the collet body is fully engaged in tension mode with the at least one work piece, only the first or distal end of the collet body is exposed to the environment, which is where the clip is located. Where the auxiliary structure ARM is a sleeve insert, the anti-rotation functionality can be anywhere along its axis, however, because a clip is predominantly an exterior structure, the second anti-rotation means is preferably located at or near the opening defining the bore through which the distal portion of the fingers of the collet body will last pass. Such location will ensure that the two parts of the ARM will interface during installation and use of the collet body.

In addition to the foregoing, collet body embodiments of the invention may further comprise a first part of a two part anti-translation means for limiting complete translation of the collet body through the work piece(s). The two part translation arresting means according to the invention comprises a feature associated with the collet body (the first part) and a cooperating feature associated with at least one of a work piece(s) or an auxiliary structure (the second part). In one group of embodiments, a collet body transverse segment, which forms a third edge and/or surface of each slot, includes a face fairly presenting to the first or distal end of the collet body. This face generally extends to the collet body outer surface. As a consequence of this geometry, the sectional geometric profile of the collet body along the radial plane at this location is generally circular, in contrast to the sectional geometric profile of the collet body along the radial plane at any location along the first wall comprising the legs. Thus, any orifice or bore having a non-circular cross section through which at least the first/distal end of the collet body will pass will necessarily include at least part of a second part of the two part anti-translation means. Stated alternatively, auxiliary structure ARMs may also function as auxiliary structure TAMs. However, instead of the reactive surface being laterally (or tangentially) exposed to receive lateral forces as is the case with the anti-rotation means, a surface of the auxiliary structure TAM presenting in the axial direction is used as the reactive surface to receive longitudinal (or axial) forces for the anti-translation means.

With respect to the foregoing embodiments wherein the auxiliary structure comprises a TAM component, a complementary structure must exist on the collet body in order for the overall means to properly function. Such collet body TAMs may comprise the previously described third wall, which defines the slot between fingers ("internal collet body TAM") or in the alternative, another series of embodiments has the first part of the TAM extending from the collet body such that it comprises that portion of the collet body having the greatest maximum diameter ("external collet body TAM"). Examples of the latter embodiments include collet bodies comprising a bushing, or other continuous or segmented radial protrusion, whether integrated with the collet body or appended thereto, that extend beyond the nominal diameter of the collet body.

Embodiments of the invention comprising a clip, which provides the collet body with at least one reactive surface that constitutes the second part of the ARM and/or the second part of the TAM, includes a distal leg comprising a collet body receiving portion having at least the second part of the ARM ("clip ARM"), and preferably the second part of the TAM ("clip TAM"). In addition, each clip further comprises a proximal leg linked to or extending from the lower arm portion, between which at least one work piece may be disposed. The distal and proximal legs of the clip each define a bore through which at least part of a generally complementary collet body may pass (preferable, the collet body passes entirely through the hole defined by the proximal leg and substantially through the hole defined by the distal leg.

That portion of a clip comprising the clip ARM and/or clip TAM may be integral with the clip ("integral clip ARM" or "integral clip TAM"), or may constitute a distinct component that has been combined with the clip to possess certain elements of a SSF system ("component clip ARM" or "component clip TAM"). Therefore, in component structures the distal and proximal legs may be constructed from a resilient material such as a plastic, while the component clip ARM and/or component clip TAM, which may be a rotationally constrained bushing or tab, may be constructed from a hard and inelastic material such as steel. Accordingly, by intelligently selecting materials to meet their distinct requirements, a clip according to system embodiments of invention may be optimized in what conventionally would be considered opposite objectives.

Another advantage to the use of combined structure incorporating a component clip ARM/TAM is the ability to provide a suitable clamp-up surface. In certain cases, the work piece proximate to the component clip ARM/TAM may lack sufficient properties to function as a viable or desired clamp-up surface, e.g., a composite panel with a low crush threshold; the component clip ARM/TAM can address this deficiency without requiring that the entire clip be fabricated from the same or similar material: the clip can be constructed of plastic while the component clip ARM/TAM can be fabricated from steel and/or have a "washer" effect to distribute the localized load of the collet body protrusion trailing faces to a broader contact area against the work piece.

Figure 27:
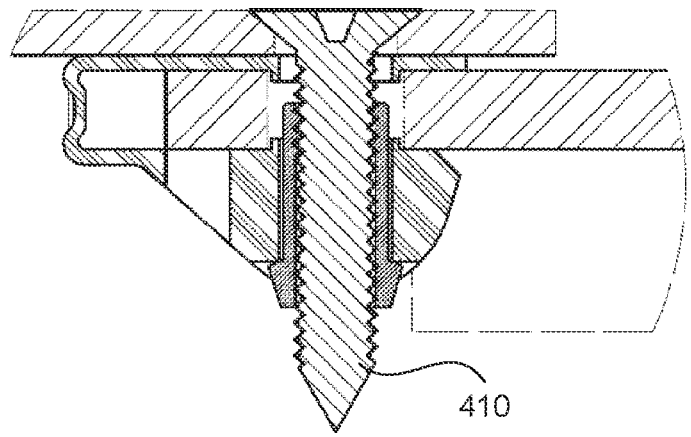
Figure 28:
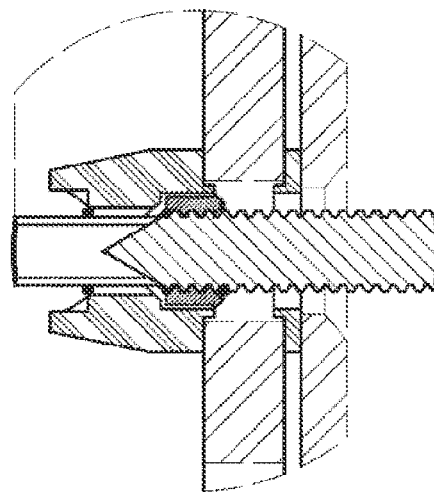
Figures 29, 30:
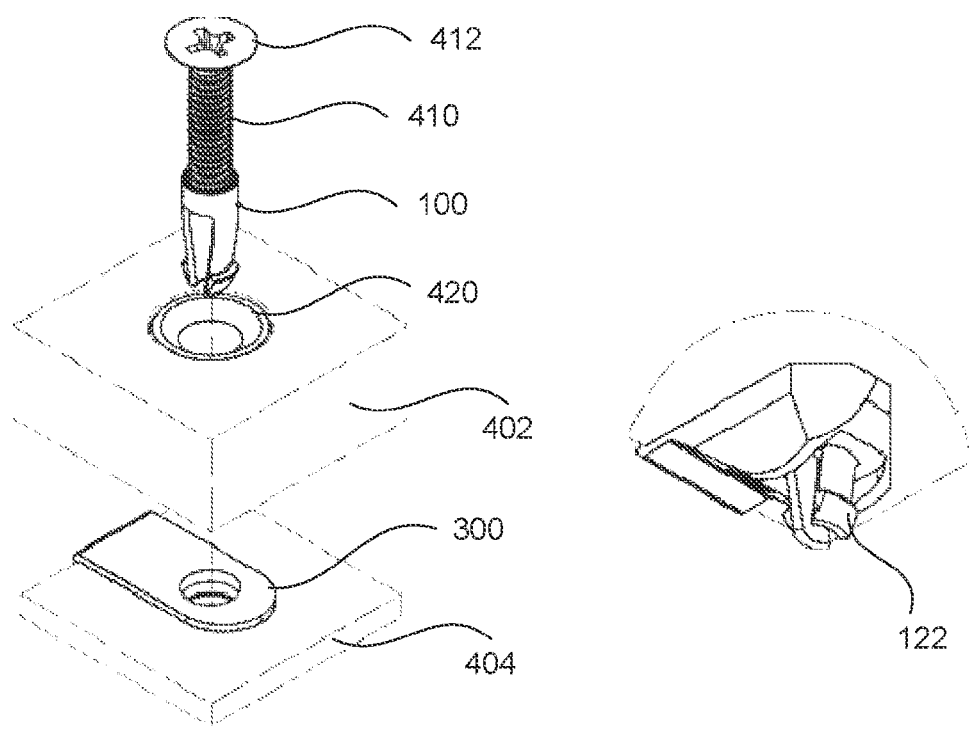
FIGS. 29-31 are a second embodiment of a fastening system comprising a collet body, a clip and a screw as shown in the first system embodiment, and further comprising a sleeve insert disposed in a bore defined by the upper panel to compress the upper panel and the substructure together.
Figure 31:
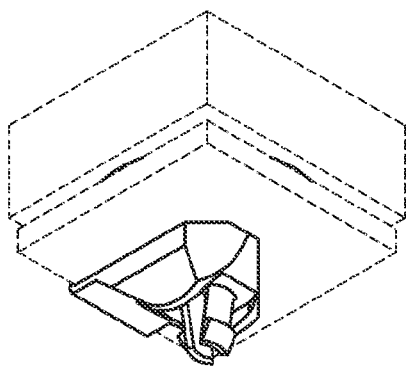
Figure 32:
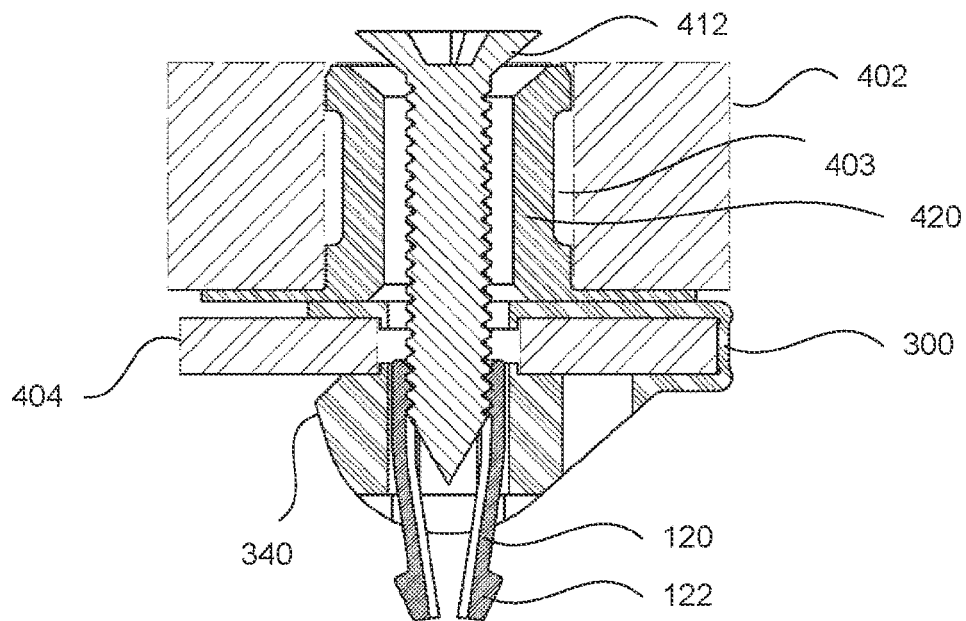
FIGS. 32-33 are a cross-section view of the second embodiment of the fastening system shown in FIGS. 29-31 in an engaged and unclamped state.
Figure 33:
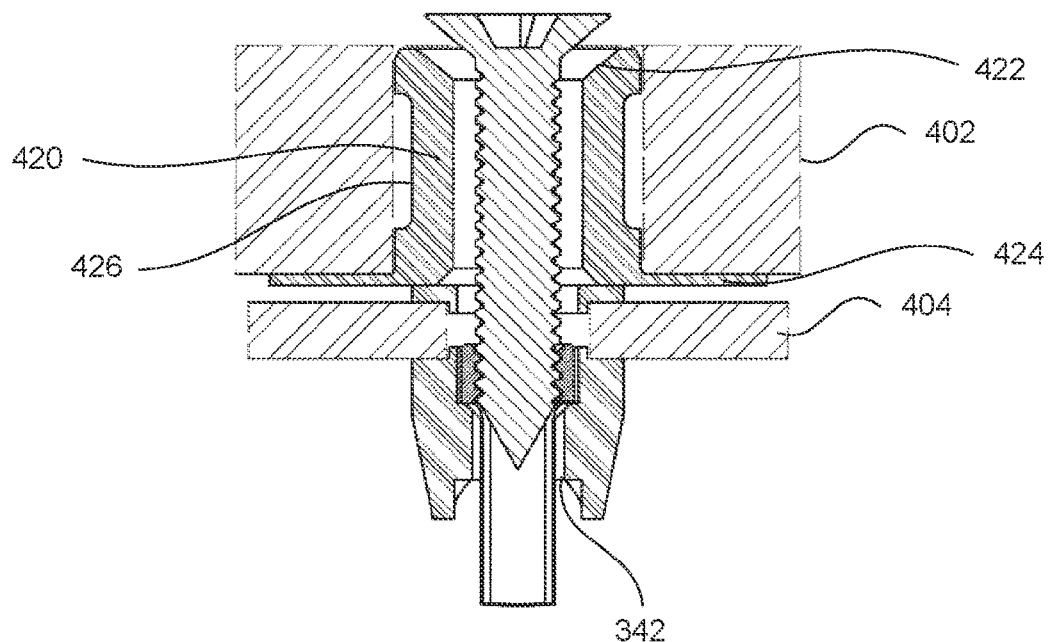
Figure 34:
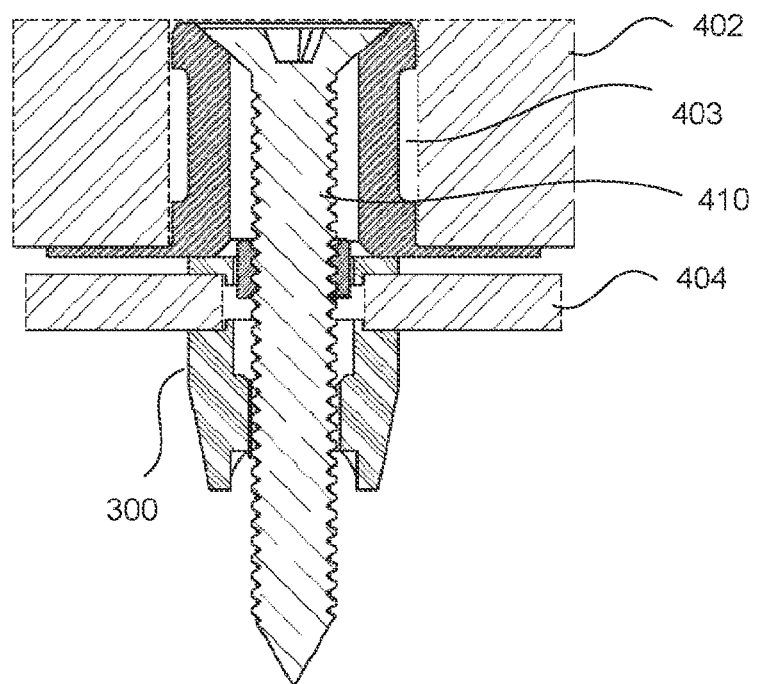
FIGS. 34-35 are a cross-section view of the second embodiment of the fastening system shown in FIGS. 29-31 in a fully clamped-up state.
Figure 35:
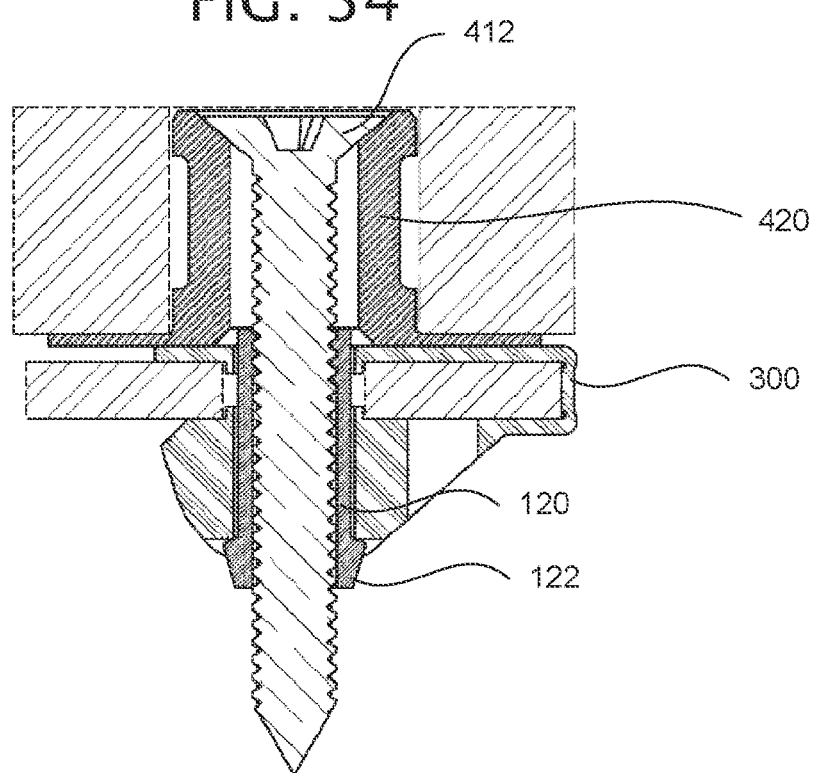

FIGS. 29-31 are a second embodiment of a fastening system comprising a collet body, a clip and a screw as shown in the first system embodiment, and further comprising a sleeve insert disposed in a bore defined by the upper or proximal panel to compress the upper panel and the substructure together. In FIGS. 29-31, FIG. 29 is an upper exploded perspective view; FIG. 30 is an enhanced lower perspective view; and FIG. 31 is a lower perspective view of the system shown in FIG. 27 wherein the collet body and stud combination of FIG. 29 have been inserted into the structures and the clip prior to clamp up (an engaged state). FIG. 32 is a cross-section view of the second embodiment of the fastening system shown in FIGS. 29-31 in an engaged and unclamped state. FIG. 33 is an elevation view in cross-section of the system shown in FIG. 32, but rotated 90°. FIG. 34 is a cross-section view of the second embodiment of the fastening system shown in FIGS. 29-31 in a fully clamped-up state. FIG. 35 is an elevation view in cross-section of the system in FIG. 34, but rotated 90°.

The fastening system shown in FIGS. 29-35 are basically the same as the first embodiment of a fastening system as shown in FIGS. 24-28 except that the second embodiment further comprises a sleeve insert 420 disposed in a bore defined by the upper panel. The sleeve insert 420 may be used in situations such as when the upper or proximal panel 402 has a bore too big for the screw 410. The sleeve insert 420 comprises a cylindrical wall 426 and a flange 424, which may be glued to the upper or proximal panel 402 such that the sleeve insert 420 is securely attached. The sleeve insert 420 also has a sloped opening 422 such that the screw head may be leveled with the proximal panel 402.

Still another advantage to the use of combined auxiliary structure incorporating a component clip ARM/TAM is the ability to permit limited axial motion of the component clip ARM/TAM, from which may extend, towards the second or proximal end of the collet body, a liner or bushing insert. A liner or bushing insert is a cylindrical structure that has an external diameter nominally less than that of the bore directly proximate to the component clip ARM/TAM, and in internal diameter that still permits operative translation of at least the distal/first end of the collet body there through. When the component clip ARM/TAM is axially compressed and translated by the trailing face of the radial protrusion, the liner or bushing insert is caused to enter (and further enter if already centered within the bore) into the adjacent bore. By so doing, liner inserts act as a barrier to contact between the collet body and the work piece; this ability is particularly useful where galvanic corrosion is a concern or where possible shear movement occurs between the work pieces and/or the clip. Moreover, bushing inserts permit the use of smaller diameter collet bodies, for example, while still allowing for proper doweling of the bore; this ability is particularly useful when a reduced tool inventory for disparate use applications is important (fewer, collet body varieties are needed; precise doweling is accomplished by application specific clips, which may be primarily plastic except for the bushing and second part ARM).

FIGS. 36-40 are a second embodiment of the clip 900 comprising an insertable bushing 500 rotationally constrained by a portion of the clip to function as the second part of the two-part ARM and the second part of the two-part TAM. Specifically, FIG. 36 is a lower perspective view of the clip; FIG. 37 is an upper exploded perspective view of the clip; FIG. 38 is a side elevation view of the clip; FIG. 39 is a bottom plan view of the clip; and FIG. 40 is a top plan view of the clip.

The insertable bushing 500 comprising a bushing wall 502 with an inner bore 506 and a bushing flange 504, which has a non-circular shape and may comprise one or more flange branches. The clip 900 is also a "U" shaped clip having a proximal leg 910 that defines a proximal hole 912, a distal leg 920 that defines a distal hole 922 aligned to the proximal hole 912, and a middle leg 930 joining the proximal leg 910 and the distal leg 920. The distal leg 920 has a lump 940, through which the distal hole 922 goes. The lump 940 has a groove 944 with a complementary profile to receive the bushing flange 504. The inner bore 506 has a diameter equal or less than the proximal hole 912 and the distal hole 922.

In some embodiments, the inner bore 506 has at least a section having an axial profile complementary to that of the collet body at its first part ARM such that each ARM part is the negative of the other (much as a splined collar is the negative of a complementary splined shaft and vice versa).

Figure 41:
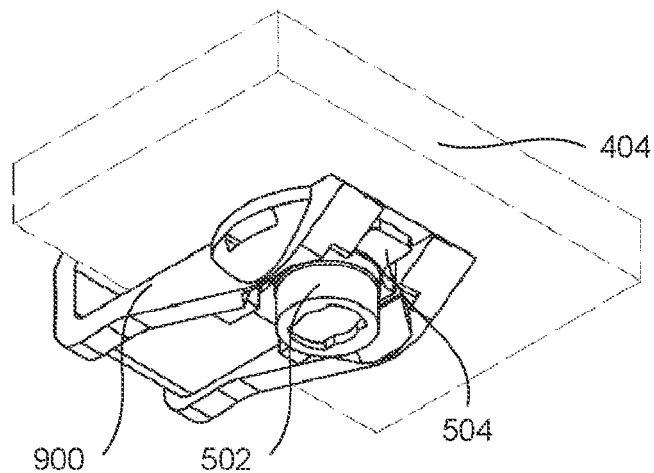
FIGS. 41-44 are a third system embodiment of the fastening system comprising a collet body, the second embodiment of the clip as shown in FIGS. 36-40 and a screw.
Figure 42:
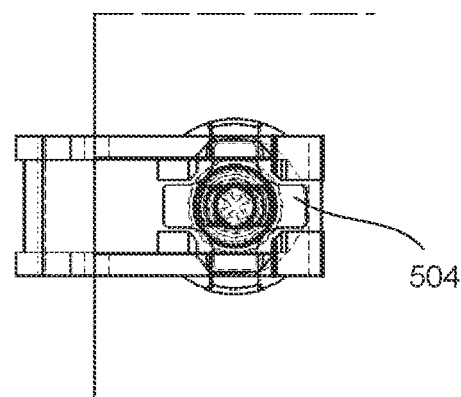
Figure 43:
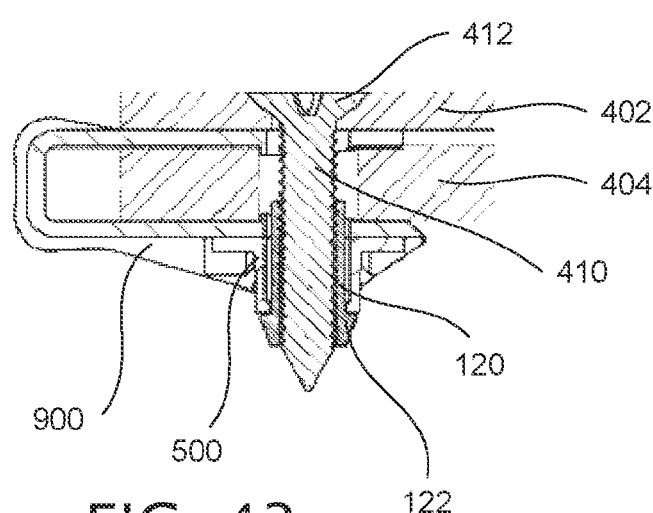
Figure 44:
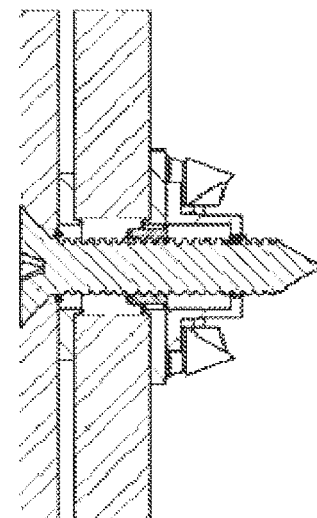

FIGS. 41-44 are a third system embodiment of the fastening system comprising a collet body, the second embodiment of the clip as shown in FIGS. 36-40 and a screw. Specifically, FIG. 41 is a lower perspective view of the clip 900 installed on a distal work piece 404; FIG. 42 is a lower perspective view of the third system embodiment of the fastening system; FIG. 43 is an elevation view in cross-section of the system; and FIG. 44 is an elevation view in cross-section of the system and state shown in FIG. 43, but rotated 90°.

The screw 410 and the collet body 100 are inserted into the proximal work piece 402, the distal work piece 404, the clip 900 and the insertable bushing 500. When the screw 410 gradually engages to the collet body 100, it radially pushes the gripping fingers 120 outward and preferably causes sufficient radial expansion of the fingers to permit rotational compression between the collet body ARM and the insertable bushing 500, which is rotatably restricted by the groove 944 of the clip 900. When the screw 410 is rotated further, the collet body 100 starts to move upward (or start retraction toward the workpiece) and eventually cause contact and compression between the trailing surface 124 and the insertable bushing 500, therefore securely fasten the work pieces 402 and 404 together.

FIGS. 45-50 are a third embodiment of the clip comprising a sleeve, a primary insertable bushing 600 disposed in the flanged insertable bushing 500. Specifically, FIG. 45 is an upper exploded perspective view of a third clip embodiment; FIG. 46 is a side elevation view of the clip; FIG. 47 is an isolated front elevation view of a lower portion of the clip; FIG. 48 is a side elevation view of the clip with the primary insertable bushing shown in a translated state; FIG. 49 is an isolated front elevation view of a lower portion of the clip; and FIG. 50 is a lower perspective view of the clip.

The primary insertable bushing 600 functions as the second part of the two-part ARM and the second part of the two-part TAM. The primary insertable bushing 600 comprising a first bushing wall 602 and a second bush wall bushing 604, which may has slightly smaller exterior diameter than the first bushing wall 602 such that the primary insertable bushing 600 may be held within the flanged insertable bushing 500. The primary insertable bushing 600 has an inner bore 606, which has a non-circular section complementary to that of the collet body at its first part ARM such that each ARM part is the negative of the other (much as a splined collar is the negative of a complementary splined shaft and vice versa). In some embodiments, the primary insertable bushing 600 may be securely held within the flanged insertable bushing 500 by glue, interference fit, welded, or brazed such that the primary insertable bushing 600 may not be rotatable within the flanged insertable bushing 500.

Figure 51:
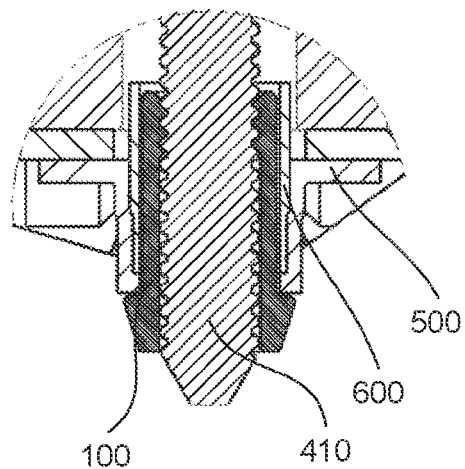
FIGS. 51-54 are a fourth system embodiment of the fastening system comprising a collet body, the third embodiment of the clip as shown in FIGS. 45-50 and a screw.
Figure 52:
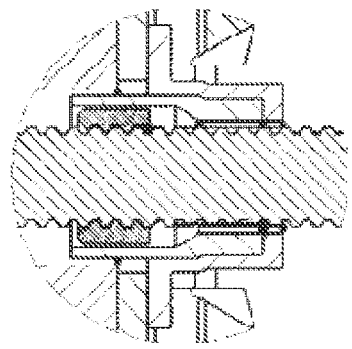
Figure 53:
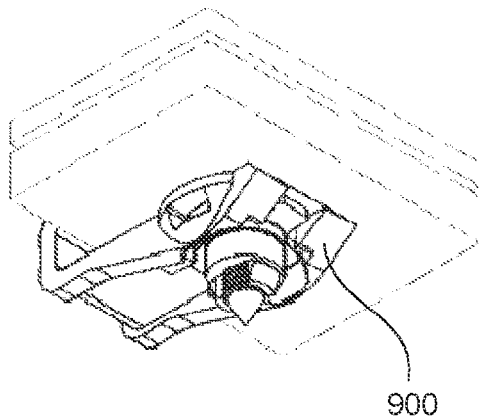
Figure 54:
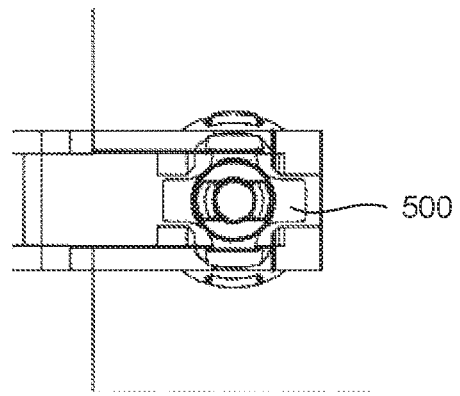

FIGS. 51-54 are a fourth system embodiment of the fastening system comprising a collet body, the third embodiment of the clip as shown in FIGS. 45-50 and a screw. Specifically, FIG. 51 is a detailed elevation view in cross-section of the system; FIG. 52 is a detailed elevation view in cross-section of the system and state shown in FIG. 51, but rotated 90°; FIG. 53 is a lower perspective view of the clip embodiment; and FIG. 54 is a bottom plan view of the clip embodiment.

The screw 410 and the collet body 100 are inserted into the proximal work piece 402, the distal work piece 404, the clip 900, the primary insertable bushing 600, and the flanged insertable bushing 500. When the screw 410 gradually engages to the collet body 100, it radially pushes the gripping fingers 120 outward and preferably causes sufficient radial expansion of the fingers to permit rotational compression between the collet body ARM and the primary insertable bushing 600, which is secured by the flanged insertable bushing 500. The flanged insertable bushing 500 is rotatably restricted by the groove 944 of the clip 900. When the screw 410 is rotated further, the collet body 100 starts to move upward (or start retraction toward the workpiece) and eventually cause contact and compression between the trailing surface 124 and the primary insertable bushing 500, therefore securely fasten the work pieces 402 and 404 together.

Figure 55:
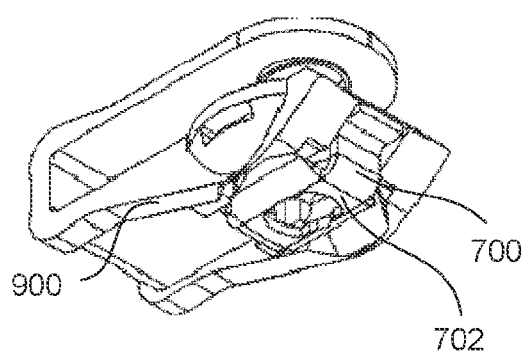
FIGS. 55-57 are a fourth embodiment of the clip comprising an insertable plate to function as the second part of the two-part ARM and the second part of the two-part TAM.
Figure 56:
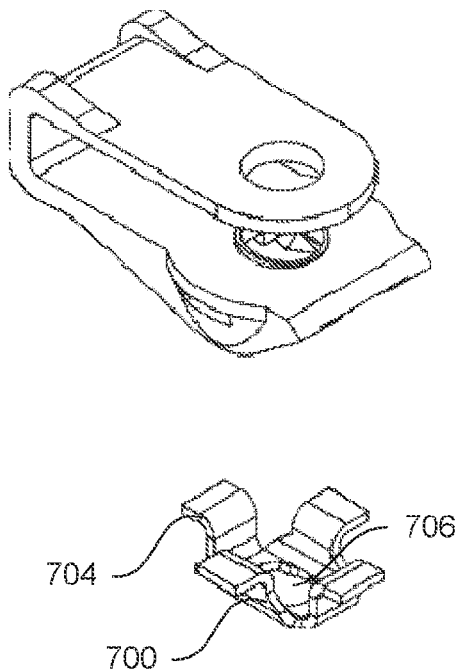
Figure 57:
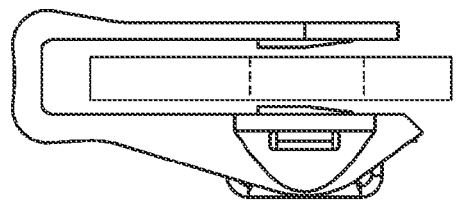

FIGS. 55-57 are a fourth embodiment of the clip comprising an insertable plate 700 to function as the second part of the two-part ARM and the second part of the two-part TAM. Specifically, FIG. 55 is a lower perspective view of a fourth clip embodiment; FIG. 56 is an upper exploded perspective view of the clip embodiment; and FIG. 57 is a side elevation view of the clip embodiment.

The fourth embodiment of the clip is basically the same as the second embodiment of the clip shown in FIGS. 36-40, except using the insertable plate 700 instead of the insertable bushing 500. The insertable plate 700 comprises a base plate 700 and a plurality of flanges 702 extending from the base plate. The flanges 702 form a profile complementary to the groove 944 of the clip 900 such that the insertable plate 700 is rotatably restricted by the clip 900. The base plate 702 has an opening 706 complementary to that of the collet body at its first part ARM (gripping fingers) such that each ARM part is the negative of the other (much as a splined collar is the negative of a complementary splined shaft and vice versa).

FIGS. 58-61 are a fifth system embodiment of the fastening system comprising a collet body, the fourth embodiment of the clip as shown in FIGS. 55-57 and a screw. Specifically, FIG. 58 is a lower perspective view of a system embodiment; FIG. 59 is a bottom plan view of the system; FIG. 60 is an elevation view in cross-section of the system;

and FIG. 61 is an elevation view in cross-section of the system and state shown in FIG. 60, but rotated 90°.

The screw 410 and the collet body 100 are inserted into the proximal work piece 402, the distal work piece 404, the clip 900, and the insertable plate 700. When the screw 410 gradually engages to the collet body 100, it radially pushes the gripping fingers 120 outward and preferably causes sufficient radial expansion of the fingers to permit rotational compression between the collet gripping fingers and the insertable plate 700, which is secured by the groove 944 of the clip 900. When the screw 410 is rotated further, the collet body 100 starts to move upward (or start retraction toward the workpiece) and eventually cause contact and compression between the trailing surface 124 and the insertable plate 700, therefore securely fasten the work pieces 402 and 404 together.

Figure 62:
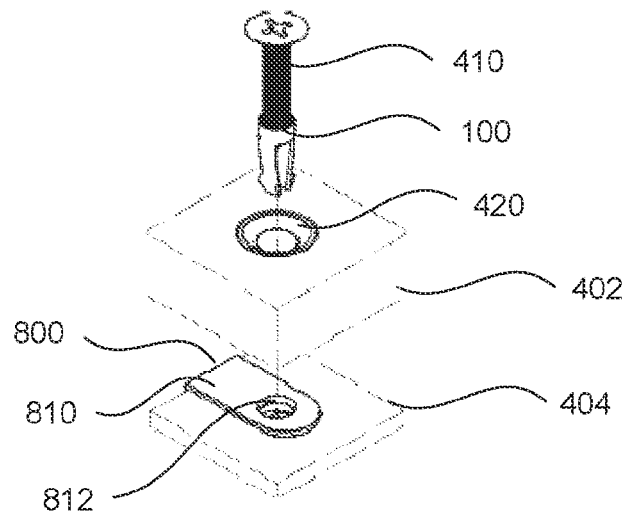
FIGS. 62-66 are a six system embodiment of the fastening system comprising a screw, the collet body shown in FIG. 1, a clip and a sleeve insert to fasten a stack (shown in phantom) comprising a proximal and a distal structures.
Figure 63:
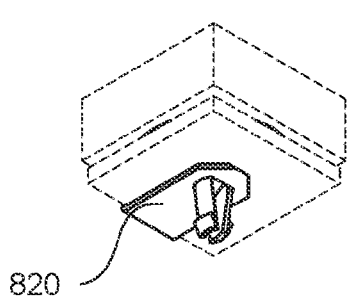
Figure 64:
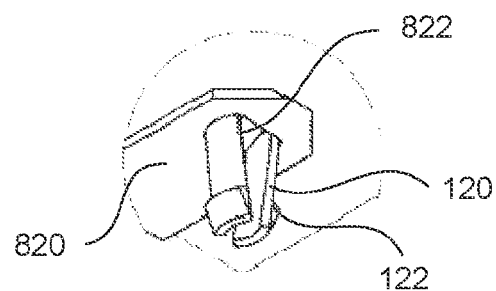
Figure 65:
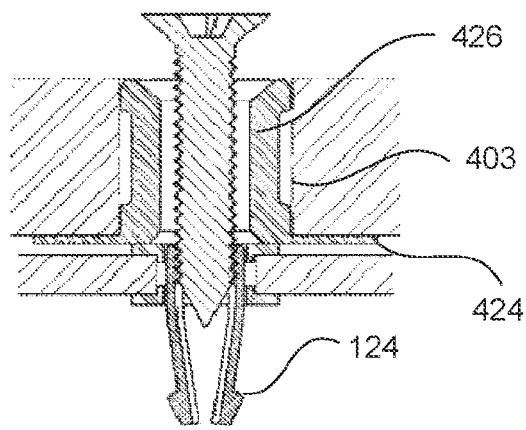
Figure 66:
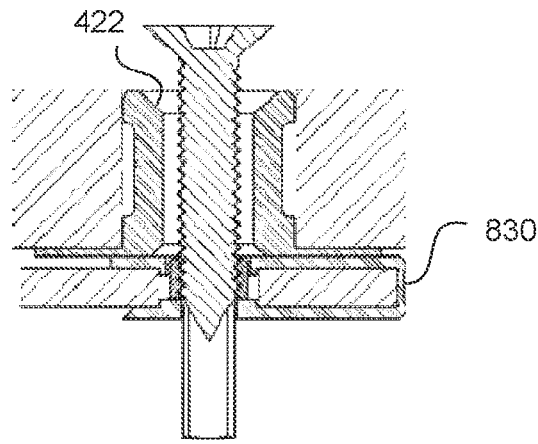

FIGS. 62-66 are a six system embodiment of the fastening system comprising a screw, the collet body shown in FIGS. 1-8, a clip 800 and a sleeve insert 420 to fasten a stack (shown in phantom) comprising a proximal work piece 402 and a distal work piece 404. Specifically, FIG. 62 is an upper exploded perspective view of a fifth system embodiment; FIG. 63 is a lower perspective view of the system; FIG. 64 is a detailed view of the collet body and lower planar portion of the clip; FIG. 65 is an elevation view in cross-section of the system; FIG. 66 is an elevation view in cross-section of the system and state shown in FIG. 65, but rotated 90°.

The clip 800 is a "U" shaped clip having a proximal leg 810 that defines a proximal hole 812, a distal leg 820 that defines a distal hole 822 aligned to the proximal hole 812, and a middle leg 830 joining the proximal leg 810 and the distal leg 820. The distal leg 820 preferably has a flat surface to allow uniform contact with the trailing surface 124. In some embodiments, the proximal leg 810 and the distal leg 820 has reinforced structure around the proximal hole 812 and the distal hole 822 respectively. The reinforcement may be implemented as a circular flange around the holes. At least one of the proximal hole 812 and the distal hole 822, preferably the latter, has an opening as a first part of the ARM complementary to the gripping fingers (second part of the ARM) of the collet body 100 such that each ARM part is the negative of the other (much as a splined collar is the negative of a complementary splined shaft and vice versa). The sleeve insert 420 comprises a cylindrical wall 426 and a flange 424, which may be glued or welded to the upper or proximal panel 402 such that the sleeve insert 420 is securely attached. The sleeve insert 420 also has a sloped opening 422 such that the screw head may be leveled with the proximal panel 402. In some embodiments, the cylindrical wall 426 has a concave exterior surface with exterior surface at a proximal and distal ends contacting the proximal work piece bore 403 in the proximal work piece 402.

Figure 67:
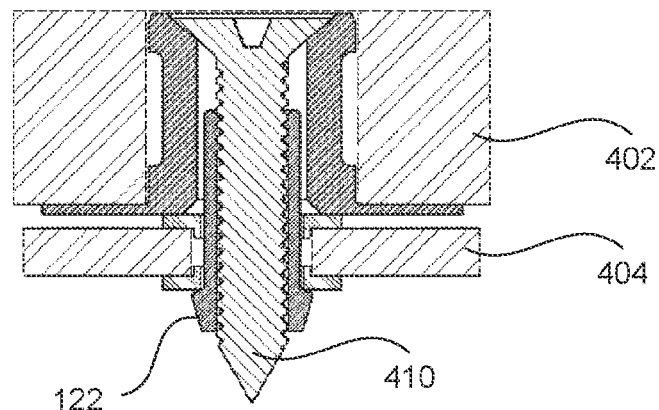
FIGS. 67-68 are cross-section views in different angels of the fastening system shown in FIGS. 62-66 in a fully clamped-up state.
Figure 68:
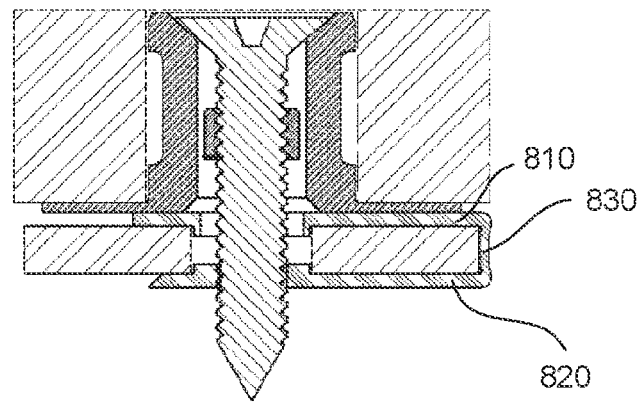

FIGS. 67-68 are cross-section views in different angels of the fastening system shown in FIGS. 62-66 in a fully clamped-up state. Specifically, FIG. 67 is an elevation view in cross-section of the system shown in FIG. 52 but after clamp up;

FIG. 68 is an elevation view in cross-section of the system and state shown in FIG. 67, but rotated 90°. The screw 410 and the collet body 100 are inserted into the sleeve insert 420, the proximal work piece 402, the distal work piece 404, and the clip 800. When the screw 410 gradually engages to the clip 800, it radially pushes the gripping fingers 120 outward and preferably causes sufficient radial expansion of the fingers to permit rotational compression within the distal hole 822 between the collet gripping fingers and the distal leg 820. When the screw 410 is rotated further, the collet body 100 starts to move upward (or start retraction toward the workpiece) and eventually cause contact and compression between the trailing surface 124 of the grip finger 120 and the distal leg 820, therefore securely fasten the work pieces 402 and 404 together.

FIGS. 69-72 are a seven system embodiment of the fastening system comprising a screw 410, the collet body 100 as shown in FIGS. 1-8, and a sleeve insert 1000 to fasten a stack (shown in phantom) comprising a proximal work piece 402 and a distal work piece 404. Specifically, FIG. 69 is an upper sectional exploded perspective view; FIG. 70 is a top plan view of the sleeve insert; FIG. 71 an upper perspective view of the sleeve insert; and FIG. 72 is a bottom plan view of the sleeve insert.

In the seven system embodiment of the fastening system, a clip is no longer used and therefore the system is simplified with fewer components. The sleeve insert 1000 is similar to the sleeve insert 420 as shown in FIGS. 32-33, except that the sleeve insert 1000 also incorporates a second part 1050 of the ARM. Like the sleeve insert 420, the sleeve insert 1000 comprises a cylindrical wall 1010 and a flange 1020, which may be glued to the upper or proximal panel 402 such that the sleeve insert 1000 is securely attached. The sleeve insert 900 also has a proximal opening 1040, a distal opening 1042, and a bore 1030 defined between the proximal opening 1040 and a distal opening 1042. The proximal opening 1040 is a sloped opening such that the screw head 420 may be leveled with the proximal panel 412 for a flat surface. The sleeve insert 1000 has a protuberance 1050 disposed within the bore at the distal opening 1042 to function as the second part of the AMR, such that the distal opening 1042 has a radical profile complementary to the gripping fingers 120 for rotation restriction of the collet body during the clamping process.

Figure 73:
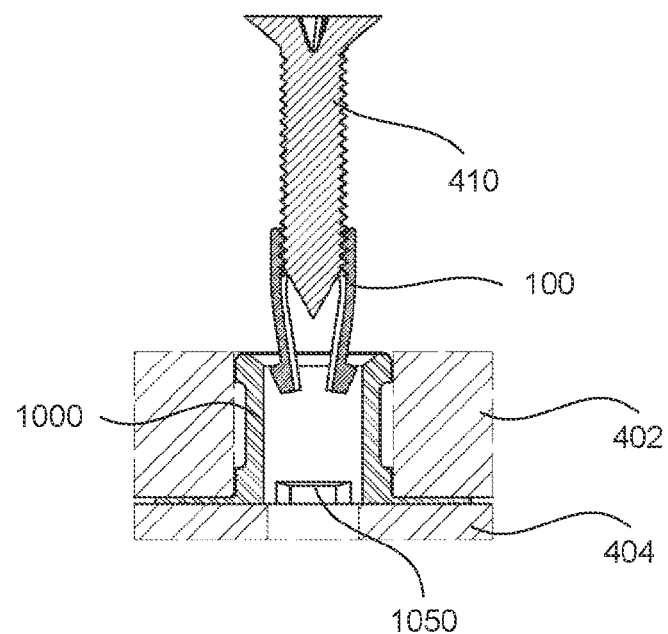
FIGS. 73-75 are a cross-section view of the system shown in FIGS. 69-72 at an initial insertion and a fully insertion of the collet body and screw combination.
Figure 74:
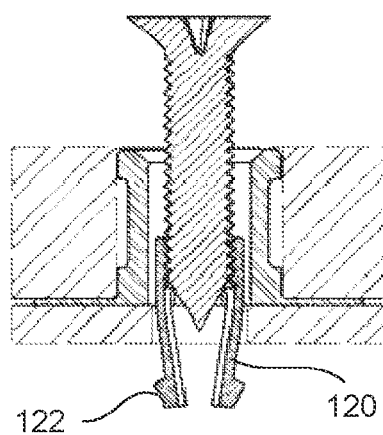
Figure 75:
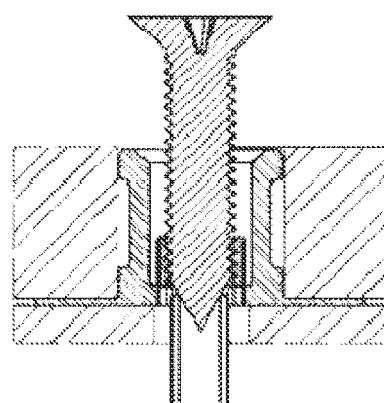
Figure 76:
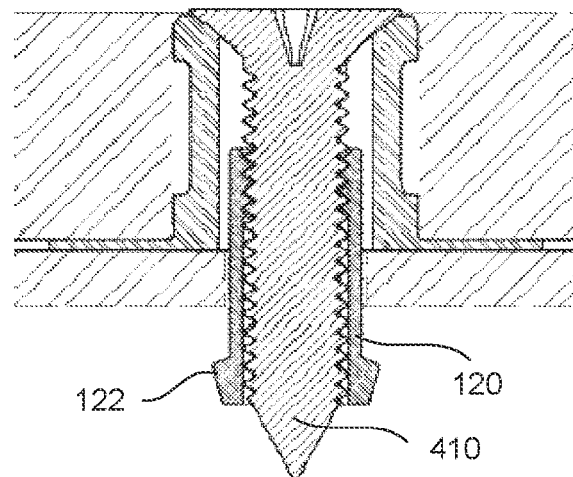
FIG. 76 are a cross-section view of the system shown in FIGS. 69-72 at an initial clamp-up state after full insertion.

FIGS. 73-75 are a cross-section view of the system shown in FIGS. 69-72 during an initial insertion and at a fully insertion of the collet body and screw combination. Specifically, FIG. 73 is an elevation view in cross-section of the system shown in FIGS. 69-72 during an initial insertion of the collet body and screw. FIG. 74 is an elevation view in cross-section of the system at a full insertion of the collet body and screw. FIG. 75 is an elevation view in cross-section of the system in FIG. 74 at a full insertion of the collet body and screw, but rotated 90°. FIG. 76 is a cross-section view of the system shown in FIGS. 69-72 at an initial clamp-up state after full insertion. FIG. 77 is a cross-section of the system shown in FIGS. 67-68 at a full clamp-up state. The screw 410 and the collet body 100 are inserted into the sleeve insert 1000, the proximal work piece 402, and the distal work piece 404. When the screw 410 gradually engages to the sleeve insert 1000, it radially pushes the gripping fingers 120 outward and preferably causes sufficient radial expansion of the fingers to permit rotational compression within the bore 1030 between the collet gripping fingers and the extrusion 950. When the screw 410 is rotated further, the collet body 100 starts to move upward (or start retraction toward the workpiece) and eventually cause contact and compression between the trailing surface 124 of the grip finger 120 and the distal workpiece 404, therefore securely fasten the work pieces 402 and 404 together.

It should be noted that while the described clips are intended to be used as part of the disclosed system, utility can be appreciated without resort to use with collet body embodiments of the invention.

Those skilled in the art will realize that the dual purpose latch can be constructed with various configurations. For example a dual purpose latch may comprise different combination of components other than disclosed in the aforementioned embodiments. Those skilled in the art will also realize that a dual purpose latch may further incorporate different components. The foregoing description of the invention has been described for purposes of clarity and understanding. Various modifications may be implemented within the scope and equivalence of the appended claims.

The invention claimed is:

1. A fastener comprising:
a collet body comprising:
- a cylindrical wall portion positioned at an upper end of the collet body and defining a longitudinal axis and having a threaded inner surface and an outer surface which has a circular shape in cross-section that cuts through the longitudinal axis; and
- one or more gripping fingers extended longitudinally from the cylindrical wall portion and separated by one or more slots, each finger having a protrusion at a fingertip, the protrusion comprising a plurality of surfaces; and a sleeve insert, comprising:
- a cylindrical wall;
- a flange extending outwardly from the cylindrical wall;
- a bore defined between a proximal opening and a distal opening;
- a first protuberance disposed within the bore at the distal opening;
- a proximal side including a chamfered surface that is sloped outward, wherein the chamfered surface includes an upper edge and a lower edge that each have a circular profile; and
- a distal side including the first protuberance and a second protuberance;

wherein the first protuberance extends radially inward;
wherein the first protuberance is an anti-rotation component;
wherein the proximal opening is sloped inward;
wherein the first protuberance has a planar lower surface; and
wherein the first protuberance has a pair of opposing angled side surfaces.

2. The fastener of claim 1, wherein the plurality of surfaces include a trailing surface.

3. The fastener of claim 2, wherein the trailing surface is configured to compressively react against a workpiece.

4. The fastener of claim 2, wherein:
the trailing surface is orthogonal to the longitudinal axis when the one or more gripping fingers diverge radially outward; and
the one or more gripping fingers are radial cut fingers or chord cut fingers.

5. The fastener of claim 1, wherein the plurality of surfaces include a leading surface.

6. The fastener of claim 5, wherein the leading surface is angled.

7. A fastener comprising:
a collet body comprising:
- a cylindrical wall portion positioned at an upper end of the collet body and defining a longitudinal axis and having a threaded inner surface and an outer surface which has a circular shape in cross-section that cuts through the longitudinal axis; and
- one or more gripping fingers extended longitudinally from the cylindrical wall portion and separated by one or more slots, each finger having a protrusion at a fingertip, the protrusion comprising a plurality of surfaces; and a sleeve insert, comprising:
- a cylindrical wall;
- a flange extending outwardly from the cylindrical wall;
- a bore defined between a proximal opening and a distal opening;
- a first protuberance disposed within the bore at the distal opening;
- a proximal side including a chamfered surface that is sloped outward, wherein the chamfered surface includes an upper edge and a lower edge that each have a circular profile; and
- a distal side including the first protuberance and a second protuberance;

wherein the first protuberance extends radially inward;
wherein the first protuberance is an anti-rotation component;
wherein the proximal opening is sloped inward;
wherein the first protuberance and second protuberance are each symmetric about a radially aligned plane; and
wherein the first protuberance has a sloped upper surface.

8. The fastener of claim 7, wherein:
the plurality of surfaces include a leading surface;
the leading surface is angled;
the plurality of surfaces include a trailing surface; and
the trailing surface is configured to compressively react against a workpiece.

* * * * *